(12) United States Patent
Morrell et al.

(10) Patent No.: US 7,323,024 B2
(45) Date of Patent: Jan. 29, 2008

(54) VESSEL WITH FILTER AND METHOD OF USE

(75) Inventors: Jonathan S. Morrell, Knoxville, TN (US); Edward B. Ripley, Knoxville, TN (US); David M. Cecala, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 351 days.

(21) Appl. No.: 11/008,655

(22) Filed: Dec. 9, 2004

(65) Prior Publication Data

US 2005/0150198 A1 Jul. 14, 2005

Related U.S. Application Data

(60) Provisional application No. 60/528,369, filed on Dec. 10, 2003.

(51) Int. Cl.
*H05B 6/80* (2006.01)
*B65D 17/48* (2006.01)

(52) U.S. Cl. ............... 55/385.1; 55/385.4; 55/498; 55/502; 55/512; 55/514; 55/515; 55/519; 96/134; 435/305.4; 435/297.5; 220/366; 220/371; 454/370; 219/725; 219/729; 219/730

(58) Field of Classification Search ............... 55/385.1, 55/385.4, 502, 498, 512–519; 96/134; 435/305.4, 435/297.5; 220/366, 371; 454/370; 219/725, 219/729, 730; 95/274
See application file for complete search history.

(56) References Cited

U.S. PATENT DOCUMENTS

| | | | |
|---|---|---|---|
| 3,071,276 A * | 1/1963 | Pellett et al. ............... 215/261 |
| 3,946,228 A | 3/1976 | Biermann | |
| 4,564,175 A | 1/1986 | Groteke et al. | |
| 4,565,669 A | 1/1986 | Collins et al. | |
| 4,670,398 A * | 6/1987 | Song ............... 435/305.4 |
| 4,781,304 A * | 11/1988 | Lapeyre ............... 220/280 |
| 4,806,718 A * | 2/1989 | Seaborne et al. ........ 219/730 |
| 4,881,677 A | 11/1989 | Amos et al. | |
| 5,353,949 A * | 10/1994 | Seibert et al. ............ 220/371 |
| 5,360,480 A | 11/1994 | Altekruger | |
| 5,519,195 A * | 5/1996 | Keefer et al. ............ 219/728 |
| 5,757,843 A | 5/1998 | Otsuka et al. | |
| 5,891,223 A * | 4/1999 | Shaw et al. ............... 96/134 |
| 6,010,552 A | 1/2000 | Gasperetti et al. | |
| 6,524,361 B1* | 2/2003 | Thornton et al. ........ 55/385.4 |
| 6,533,990 B2 | 3/2003 | Popov et al. | |
| 6,743,272 B2* | 6/2004 | Marth ............... 55/385.4 |
| 7,101,412 B2* | 9/2006 | Gossweiler ............ 55/502 |
| 7,156,890 B1* | 1/2007 | Thompson et al. ........ 55/385.3 |
| 7,166,024 B2* | 1/2007 | Mashiko et al. ......... 454/370 |

(Continued)

*Primary Examiner*—Duane Smith
*Assistant Examiner*—Minh-Chau T. Pham
(74) *Attorney, Agent, or Firm*—Michael J. Renner; Luedeka, Neely & Graham, P.C.

(57) ABSTRACT

Chemical processing apparatuses which incorporate a process vessel, such as a crucible or retort, and which include a gas separation or filtration system. Various embodiments incorporate such features as loose filtration material, semi-rigid filtration material, and structured filtration material. The vessel may include material that is a microwave susceptor. Filtration media may be selected so that if it inadvertently mixes with the chemical process or the reaction products of such process, it would not adversely affect the results of the chemical process.

18 Claims, 25 Drawing Sheets

U.S. PATENT DOCUMENTS

2002/0066370 A1* 6/2002 Goglio et al. .................. 96/134
2003/0185937 A1* 10/2003 Garwood ..................... 426/35
2005/0091950 A1* 5/2005 Weaver et al. ............. 55/385.4
2005/0106717 A1* 5/2005 Wilson et al. ........... 435/297.5

* cited by examiner

VESSEL WITH FILTER AND METHOD OF USE

CROSS REFERENCE TO RELATED APPLICATIONS

This patent application claims priority from and is related to U.S. Provisional Patent Application Ser. No. 60/528,369, "Vessel with Filter and Method of Use," Jonathan S. Morrell, Edward B. Ripley, and David M. Cecala, filed Dec. 10, 2003. This U.S. Provisional Patent Application is incorporated by reference in its entirety herein.

The U.S. Government has rights to this invention pursuant to contract number DE-AC05-00OR22800 between the U.S. Department of Energy and BWXT Y-12, L.L.C.

FIELD OF THE INVENTION

This invention relates to chemical processing apparatuses which incorporate a process vessel, such as a crucible or retort, and which include a gas separation or filtration system.

BACKGROUND

Many chemical processes result in the creation of gases for which filtration is desired prior to their release to the atmosphere. Various means of trapping or absorbing various components of such gas streams, including particulates, have been developed for this purpose. In some systems granular beds of materials such as activated alumina or molecular sieves are sometimes used to filter the gas stream. Commercial, off-the-shelf high-efficiency particulate air (HEPA) filters are also sometimes used for this purpose. Other systems that may be used include wet scrubbing systems in which gases are dissolved in a fluid, and cold-finger traps where volatile organics are condensed and removed as liquids. However, these systems typically permit off-gas contamination of extensive portions of the processing apparatus. Furthermore, existing systems are generally not compatible with advanced heating technology such as microwave furnaces and infrared heating systems. What is needed, therefore, is an apparatus for processing chemicals that has a self-contained filtration system and that is compatible with advanced process heating devices.

SUMMARY

Many of the foregoing and other needs are met by an apparatus comprised of a vessel having a base and a wall extending upward from the base. The wall has a lip which defines an opening. The apparatus also includes a cover placed over the opening, the cover having a lateral flange, where the position and dimensions of the lateral flange are of sufficient extent in all lateral directions so that at least the lateral flange substantially overlaps the opening. Loose filtration material is disposed between the lip of the vessel and the lateral flange. In a preferred embodiment, the lip of the vessel has a circumferential groove, the cover has a rim that extends downward from the lateral flange and partially fits into the groove, and the loose filtration material is dispersed in the groove between the bottom of the groove and the rim.

In an alternate preferred embodiment, loose filtration material is dispersed on a horizontal surface, a first vessel having an opening is placed with its base on the loose filtration material such that the opening is above the surface of the loose filtration material, and a second inverted vessel having a base and a wall extending downward from the base of the second vessel in its inverted position with the wall having a lip which defines an opening and where the lateral dimensions of the wall are sufficient in all lateral dimensions to permit the second vessel in its inverted position to fit over the first vessel when the second vessel is placed over the first vessel and where the combination of the height of the loose filtration material and the length of the wall of the second inverted vessel are such that substantially all of the circumferential segments of the edge of the lip of the inverted second vessel rest on the loose filtration material.

In an alternate embodiment, an apparatus comprises a vessel that is comprised of a material that is a susceptor of microwaves and the vessel has a lip that defines an opening. A cover is placed over the opening, the cover having a lateral flange, where the position and lateral dimensions of the lateral flange are of sufficient extent in all lateral directions to at least substantially overlap the opening in the vessel, and filtration media is disposed between the lip and the lateral flange.

In another embodiment, a vessel is used where the vessel is comprised of a material that is a susceptor of microwaves and the vessel has a lip which defines an opening. A cover is placed over the opening, where the cover is sized to be smaller in all lateral dimensions than the opening, and the cover is positioned in the opening, Filtration media is disposed between the lip and the cover.

In a further embodiment, the apparatus comprises a vessel that is comprised of a material that is a susceptor of microwaves and where the vessel has a lip which defines an opening, a cover is placed over the opening, where the lateral dimensions of the cover are of sufficient extent in all lateral directions to substantially fill the opening in the vessel and where the cover has a hole established by a cutout edge in the cover, and filtration media is disposed across the hole in the cover.

In a further variation, a vessel having an upward wall with a lip that defines an opening is used, where the vessel is comprised of a material that is a susceptor of microwaves, and filtration media is disposed across the opening.

In yet another embodiment, the apparatus comprises a vessel that is comprised of material that is a susceptor of microwaves. The vessel has a wall with a longitudinal section with a lip that defines an opening. The wall has a hole established by a cutout edge. The apparatus further comprises a cover placed over the opening, the cover having a lateral flange, where the lateral dimensions of the lateral flange are of sufficient extent in all lateral directions to entirely overlap the opening in the vessel and where the lateral flange is positioned to form a substantially gap-less seal between the lip of the vessel and the cover, and filtration material disposed across the hole.

In a different embodiment, a container having a port defined by a cutout edge is used, and a chemically stable filter medium is disposed across the port.

In a still further embodiment, the apparatus comprises a container that is comprised of a material that is a susceptor of microwaves and the container has at least one orifice passageway. Semi-rigid filtration material comprised of a chemically stable filter medium is disposed across the orifice passageway.

A method according to the invention involves placing a charge in a container which, except for at least one orifice passageway, provides a substantially gas-tight environment. The orifice passageway is substantially filled with filtration media and the container is comprised of material that is a susceptor of microwaves. The method continues with a step of surrounding the container with a thermal insulating casket that is transparent to microwaves. The method then involves exposing the charge, the container, and the casket to microwaves at least until a desired chemical reaction in the charge occurs.

An alternate method for chemical processing comprises placing a charge in an apparatus comprising a container. The container comprises a vessel where the vessel is comprised of material that is a susceptor of microwaves and the vessel has a lip which defines an opening. The container further comprises a cover placed over the opening, the cover having a lateral flange. The dimensions of the cover are of sufficient extent in all directions so that at least the lateral flange substantially overlaps the opening in the vessel. The apparatus further comprises filtration media disposed between the lip and the lateral flange. The method concludes with exposing the apparatus to microwaves.

Another method for chemical processing comprises placing a charge in an apparatus comprising a vessel where the vessel is comprised of material that is a susceptor of microwaves. The vessel has a lip which defines an opening. The apparatus further comprises a cover placed over the opening, the cover having a lateral flange that is larger in all lateral dimensions than the opening and the cover also has a plug that is smaller than the opening. The plug is positioned in the opening. The apparatus further comprises filtration media disposed between the lip and the cover. The method concludes with exposing the apparatus to microwaves.

A further method for chemical processing comprises placing a charge in an apparatus comprising a container. The container comprises a vessel, and the vessel is comprised of material that is a susceptor of microwaves. The vessel has a lip which defines an opening. The container further comprises a cover placed over the opening, where the lateral dimensions of the cover are of sufficient extent in all lateral directions to substantially fill the opening in the vessel, and the cover has a hole established by a cutout edge in the cover, The apparatus further comprises filtration media disposed across the hole in the cover. The method concludes with exposing the apparatus to microwaves.

Another method for chemical processing comprises placing a charge in an apparatus comprising a vessel. The vessel has an upward wall with a lip which defines an opening. The vessel is comprised of material that is a susceptor of microwaves. The apparatus further comprises filtration media disposed across the opening. The method concludes with exposing the apparatus to microwaves.

In another method for chemical processing the first step comprises placing a charge in an apparatus comprising a container. The container comprises a vessel having a wall with a longitudinal section with a lip which defines an opening. The wall also has a hole established by a cutout edge. Further, the vessel is comprised of material that is a susceptor of microwaves. The container further comprises a cover placed over the opening, the cover having a lateral flange, where the lateral dimensions of the lateral flange are of sufficient extent in all lateral directions to substantially overlap the opening in the vessel and where the lateral flange is positioned to form a substantially gap-less seal between the lip of the vessel and the cover. The apparatus further comprises filtration media disposed across the hole. The method concludes by exposing the apparatus to microwaves.

BRIEF DESCRIPTION OF THE DRAWINGS

Further advantages of the invention are apparent by reference to the detailed description in conjunction with the figures, wherein elements are not to scale so as to more clearly show the details, and wherein like reference numbers indicate like elements throughout the several views. It will be understood that the various embodiments shown are intended as examples and do not limit the scope of the invention.

DETAILED DESCRIPTION

Described next are several embodiments of this invention.

Figure 1:
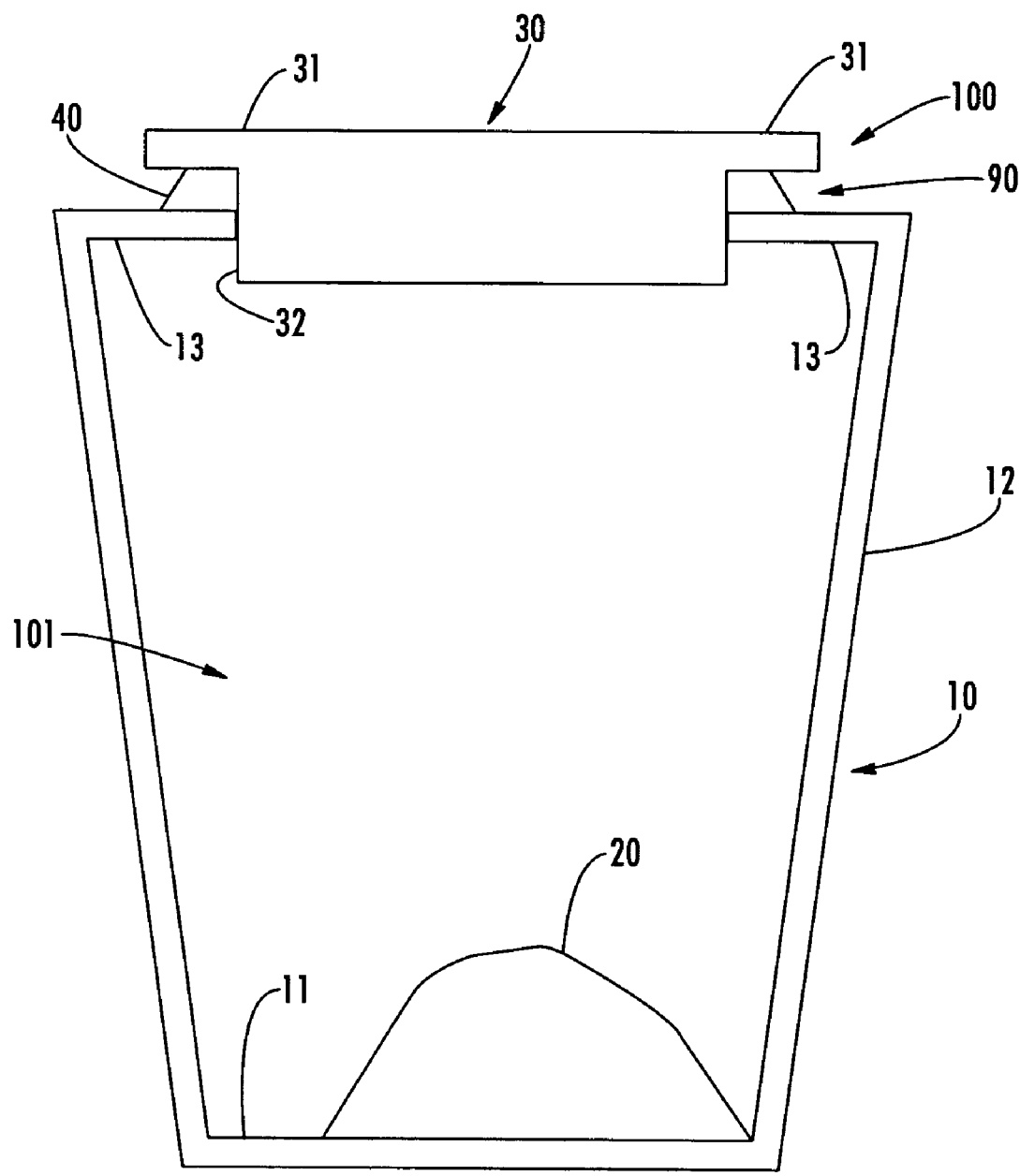
FIG. 1 provides a cross-sectional view of a vessel according to one embodiment of the invention.

FIG. 1 illustrates a cross-sectional view of one embodiment of this invention. In this and other embodiments, the apparatus resides within an external physical environment which includes a "surrounding atmosphere." For example, the external physical environment may be the interior of a furnace, and, for example, the surrounding atmosphere may be characterized as a partial atmospheric vacuum, or as an inert gas, or as ambient air. In this particular embodiment a container 100 is comprised of a vessel 10 and a cover 30. The vessel 10 is comprised of a base 11 and a longitudinal wall 12. The longitudinal wall 12 is a laterally-enclosed tubular structure which is sealed at one end by the base 11, and which is typically cylindrical, or conical, or polygonal in shape. For illustrative purposes in this and other figures the vessel is shown to contain a charge 20 which comprises chemicals to be processed using this apparatus. An example of a charge 20 is a mixture of titanium dioxide and lithium powders for which a reduction reaction is desired. In the embodiment of FIG. 1, a lip 13 is formed as a lateral extension of the longitudinal wall 12. In variations of this and other embodiments, a lip may be formed by broadening the thickness of the vessel at the upward end of a longitudinal wall, or by making the entire longitudinal wall sufficiently thick to accomplish the desired functions of a lip.

Figure 1A:
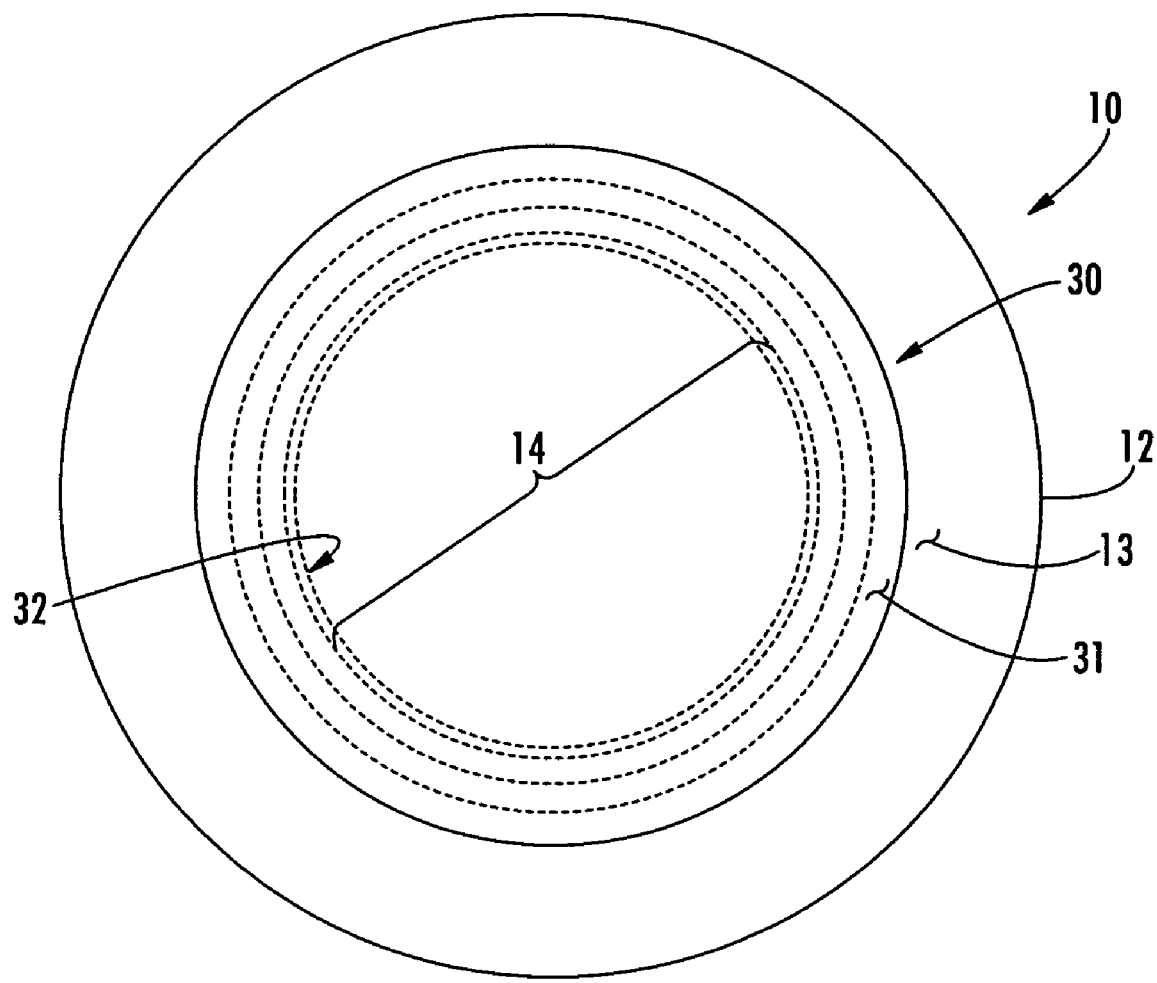
FIG. 1A is a top view of the vessel according to FIG. 1.

In the embodiment illustrated in FIG. 1, the apparatus further comprises a cover 30 which is comprised of a lateral flange 31, and a plug 32 which, in this embodiment, fits snugly between lateral portions of longitudinal wall 12 that establish lip 13. In variations of this and other embodiments the plug 32 may fit loosely. In some embodiments, the plug 32 may be eliminated, and lateral flange 31 alone substantially comprises the sealing mechanism of cover 30. FIG. 1A further illustrates the relationship between components of vessel 10. For simplicity, charge 20 and loose filtration material 40 (to be described later) are not depicted. Viewed as in FIG. 1A from above vessel 10 looking down, the only visible features are lip 13 and flange 31. Lip 13 forms an opening 14 and plug 32 fits loosely into opening 14.

The space between the lateral flange 31 of the cover 30 and the lip 13 as depicted in FIG. 1 plus the space between opening 14 and plug 32 as depicted in FIG. 1A, establish an orifice passageway 90. The orifice passageway (90 in this case) provides a path for gasses, vapors, liquids, and particles to enter into or exit from the interior volume 101 of the container 100 as chemical processing of the charge 20 takes place.

The container 100 is characterized as having an element or a combination of elements (elements 10 and 30 in this case) which, except for one or more orifice passageways (90, in this case), provide a substantially liquid- and gas-tight environment for the charge 20.

Finally, in this and some other embodiments, loose filtration material 40 is preferably disposed across the orifice passageway 90 depicted in FIG. 1, so that it is disposed between the lateral flange 31 of the cover 30 and the lip 13. Loose filtration material is an example of filtration media. The loose filtration material 40 may consist of various granular, or fibrous, or porous materials, or combinations thereof. Examples of such materials include silica powder, carbon powder, cellulose fibers, and metal filaments. Such material is typically selected for a particular chemical process from various alternatives because the selected material is known to substantially trap selected gases, vapors, liquids, or particles as they pass between the interior volume of the vessel 10 and the external atmosphere, where the passage of such chemicals is not desired. Also, when vessel 10 is heated with microwaves, the loose filtration material prevents escape of metal vapors which may cause arcing or plasma formation in the microwave chamber. Loose filtration material is further characterized by dispersal in a manner where the material is at least partially not constrained in one or more directions either by its own structure or by an external physical structure. For example, in FIG. 1 the loose filtration material 40 is comprised of loose granules that are not constrained by a physical structure in the radial direction outward from the plug 32. The intent is that the loose filtration material forms a substantially gap-less porous filter between the lateral flange 31 of the cover and the lip 13. The term "gap-less porous filter" refers to a configuration where, within the expected operating pressures for the apparatus, if the ambient gas, vapor, or liquid pressure on one side of the filtration media (e.g., loose filtration material 40, in this case) is higher than the pressure on the other side of the filtration media, substantially all of the gas, liquid, and entrained particles on the high pressure side of the filtration media that move to the low pressure side as a result of the pressure differential will flow through the filtration media (loose filtration material 40, in this case).

The term "disposed across" an element means that the filtration media (for example, loose filtration material 40) forms an interconnection across the element such that substantially all gas, vapor, liquid or particles passing through the element to and from the internal volume of the vessel and the surrounding atmosphere pass through the filtration media. The "element" referred to here may be an orifice passageway, a port, a hole, an opening, or a similar element. In some embodiments this interconnection of the filtration media across an element may be enhanced by bonding, welding, brazing, threading, pressure-fitting, or similar techniques.

The term "disposed between" two or more elements means that the filtration media (loose filtration material 40, for example) forms an interconnection between two elements (the lateral flange 31 of the cover 30 and the lip 13, in this case) such that substantially all gas, vapor, liquid or particles passing between these elements to and from the internal volume 101 of vessel 100 and the surrounding atmosphere pass through the filtration media.

Figure 2:
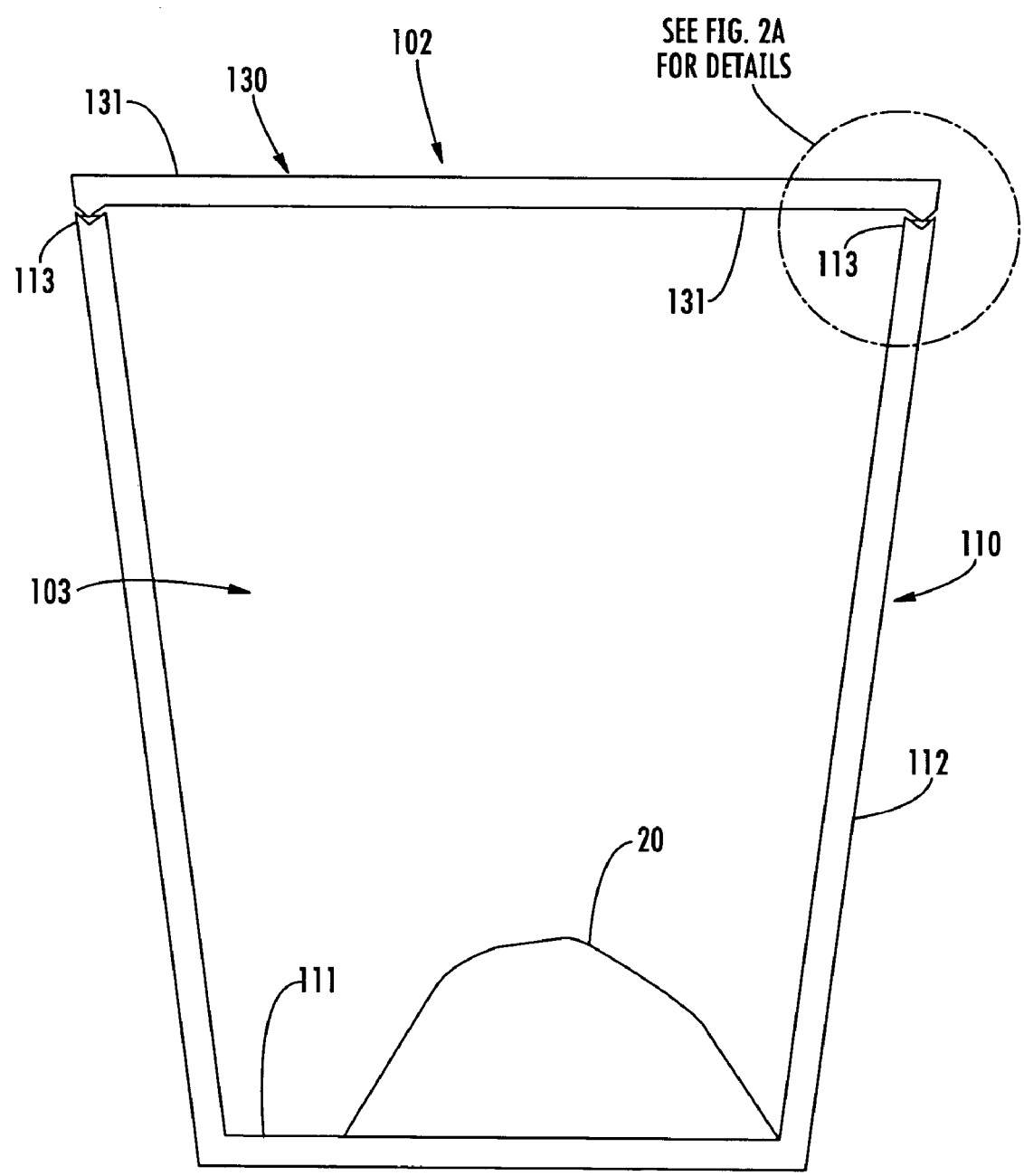
FIG. 2 provides a side cross-sectional view of a vessel according to another embodiment of the invention.
Figure 2A:
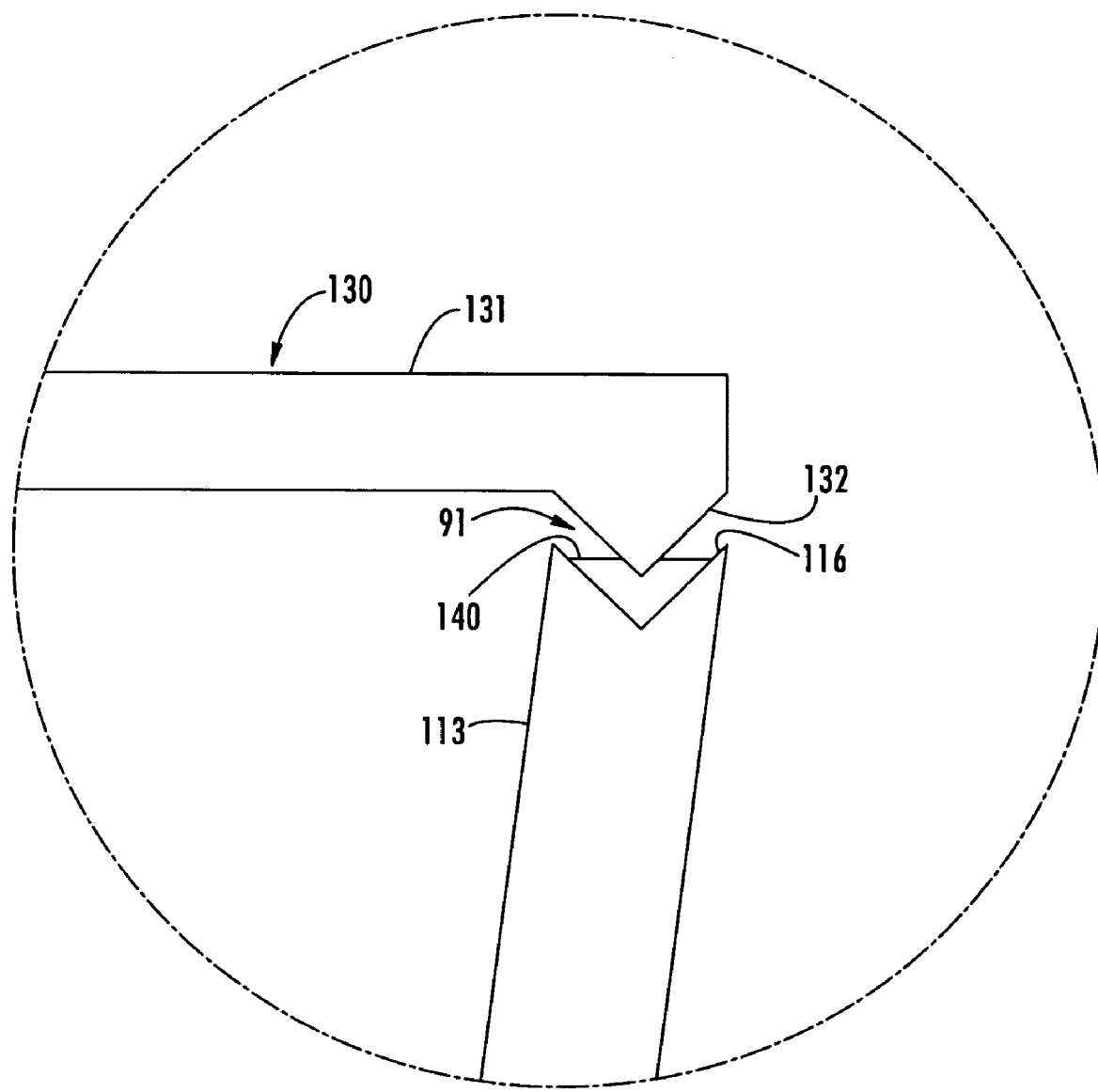
FIG. 2A provides an enlarged cross-sectional view of certain features according to the embodiment of FIG. 2.
Figure 2B:
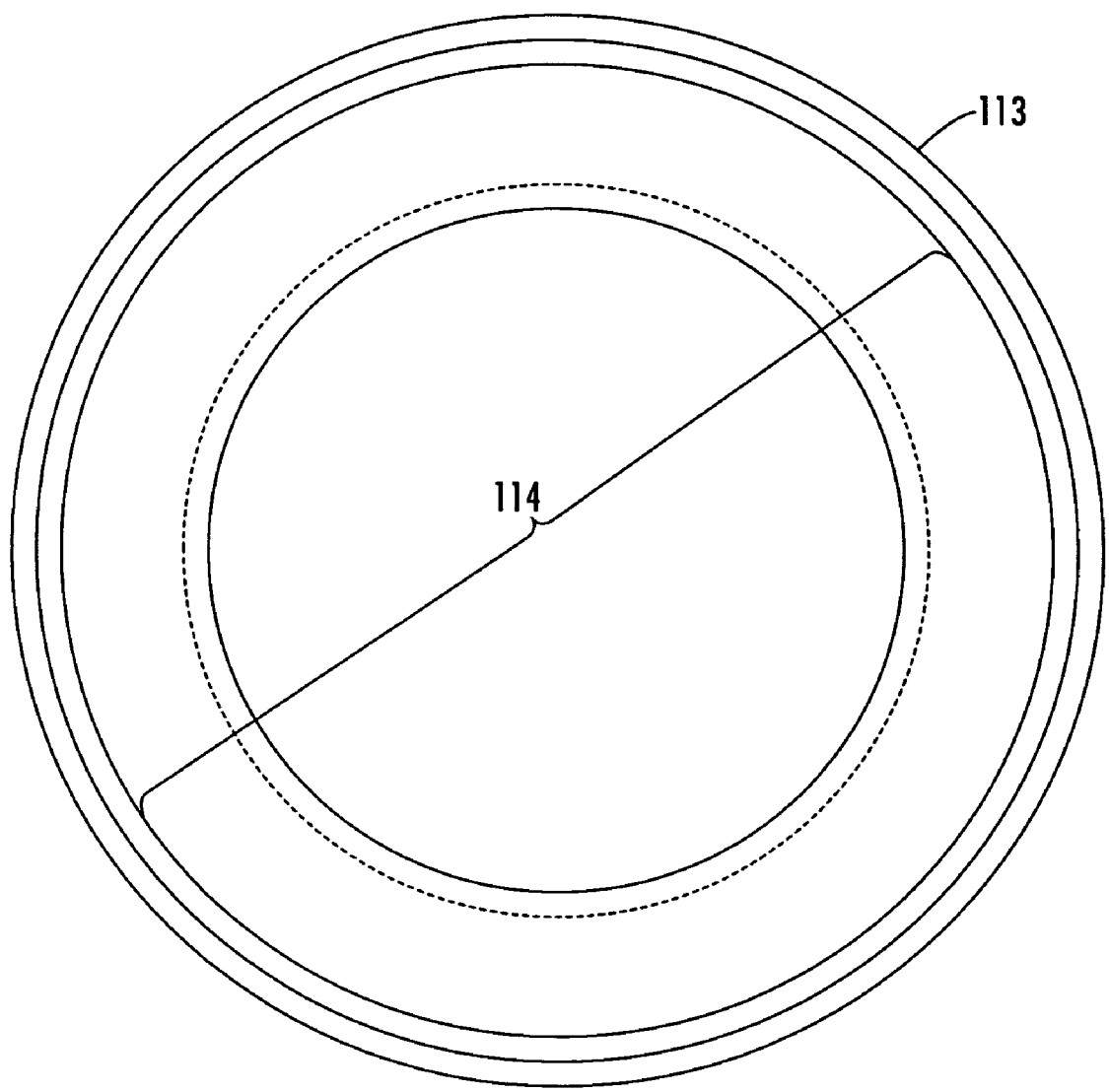
FIG. 2B provides a top view of the embodiment of FIG. 2.

In a second embodiment of this invention, as illustrated in FIG. 2, a container 102 is comprised of a vessel 110 and a cover 130. Container 102 has a base 111 and a longitudinal wall 112. A charge 20 is placed in the vessel 110. In a preferred embodiment the vessel 110 is comprised of material that is a susceptor to microwaves. Preferably, a circumferential groove 116 (detailed in FIG. 2A) is machined into the lip 113 of the vessel 10. In an alternate embodiment comprising a metal vessel the circumferential groove 116 could be formed by flaring (mechanically bending) the lip 113 laterally inward or outward, and forming a circumferential groove in the flared section. Note that FIG. 1, lip 13 is horizontal whereas in FIG. 2A, lip 113 is substantially vertical. A distinguishing feature of a "lip" in a vessel is its proximity to an opening, not its orientation. For example, horizontal lip 13 in FIGS. 1 and 1A is proximal to opening 14 (labeled in FIG. 1A). Substantially vertical lip 113 in FIGS. 2, 2A, and 2B is proximal to opening 114 (labeled in FIG. 2B). Further, in the embodiment detailed in FIG. 2A, the lateral flange 131 of the cover 130 has a circumferential rim 132 with a "v" cross-section which projects downward from the lateral flange 131 so that the rim 132 is configured to conform to and fit in part into circumferential groove 116. The space between the circumferential groove 116 and the rim 132 in FIG. 2A defines an orifice passageway 91. The container 102 is characterized by having an element or a combination of elements (elements 110 and 130 in this case) which, except for one or more orifice passageways (91, in this case), provide a substantially leak-tight environment for the charge 20.

Figure 2C:
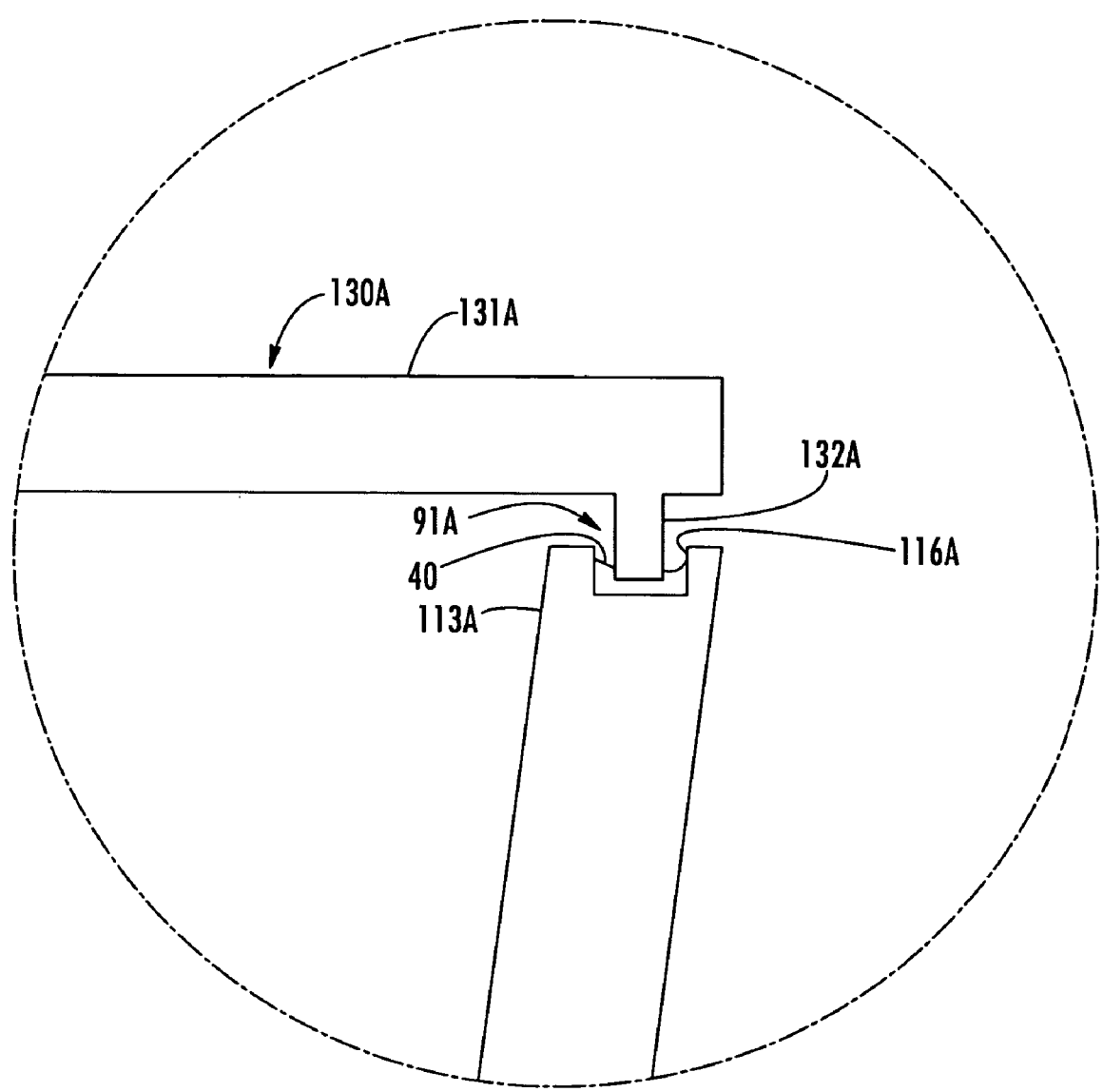
FIG. 2C is an enlarged cross-sectional view of certain features of an alternate embodiment.

In this embodiment the loose filtration material 40, preferably substantially comprised of a chemically stable filter medium, is placed within the circumferential groove 116 such that it is disposed across the orifice passageway 91, that is, disposed between the circumferential groove 116 and the rim 132. In a preferred embodiment the cover would also be comprised of material that is a susceptor of microwaves, and the weight of the cover would be sufficient to substantially maintain the position of the rim 132 relative to the groove 116 during the chemical reaction that takes place when the apparatus is placed in an oven and heated. FIG. 2C illustrates an alternate embodiment of a cover 130A having edge portion 131A with a circumferential groove 116A, circumferential rim 132A, and orifice passageway 91A. Loose filtration material 40 is disposed between groove 116A and rim 132A.

Figure 3:
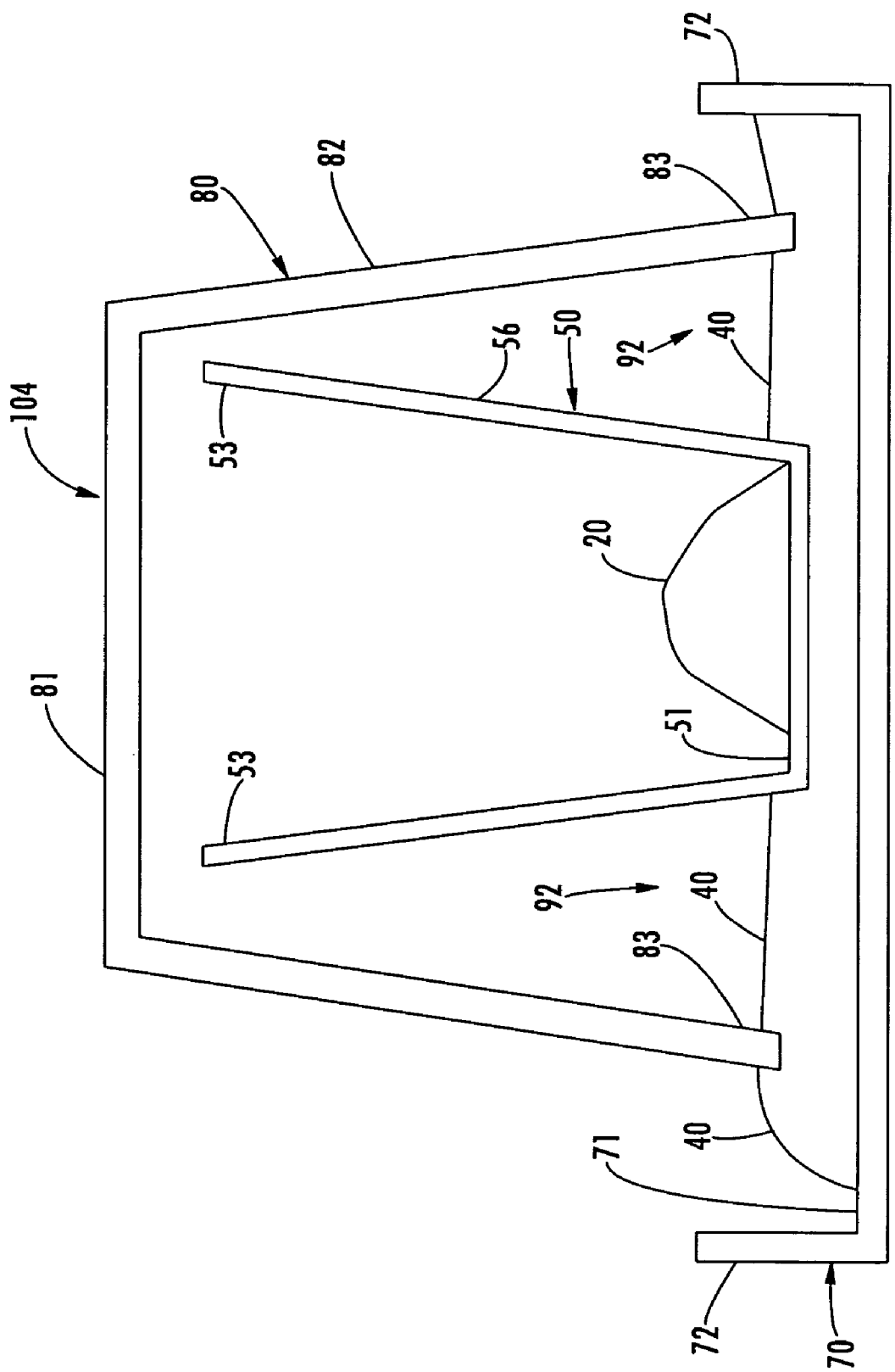
FIG. 3 provides a cross-sectional view of another embodiment of the invention.

In an alternate embodiment depicted in FIG. 3, a container 104 is comprised of a first vessel 50, a second inverted vessel 80, and a tray 70. In this embodiment, the first vessel 50 having a base 51, longitudinal wall 52 with lip 53 is placed in loose filtration material 40 which had been placed on a generally horizontal surface 71 of the tray 70, such that the loose filtration material 40 substantially circumferentially surrounds the first vessel 50. Lip 53 defines an opening in first vessel 50. A charge 20 such as titanium dioxide and lithium powders is placed in the first vessel 50. The second inverted vessel 80 is comprised of a base 81 and a longitudinal wall 82 with a lip 83, and the second inverted vessel is placed over the first vessel 50 such that substantially all of the circumferential segments of the edge of the lip 83 of the second vessel 80 are resting in or on the loose filtration material 40. The space between the lip 53 of the first vessel 50, the lip 83 of the second vessel 80, and the horizontal surface 71 in FIG. 3 establishes an orifice passageway 92. The container 104 is characterized by having an element or a combination of elements (elements 50, 80 and 70 in this case) which, except for one or more orifice passageways (92 in this case), provide a substantially leak-tight environment for the charge 20.

In any embodiment employing a tray 70, it is preferred, as illustrated in FIG. 3, to provide vertical risers 72 attached to the horizontal surface 71 of the tray 70 to partially confine the lateral dispersion of the loose filtration material 40. Preferably tray 70 is a third vessel that is larger in diameter than the other two vessels. In a preferred embodiment the second vessel 80 and the tray 70 are comprised of materials such as alumina that are transparent to microwaves. It is seen that in this configuration substantially all gases, vapors, liquids, or particles passing through the orifice passageway 92 between the surrounding atmosphere and the first vessel 50 will pass through the loose filtration material 40.

Figure 4:
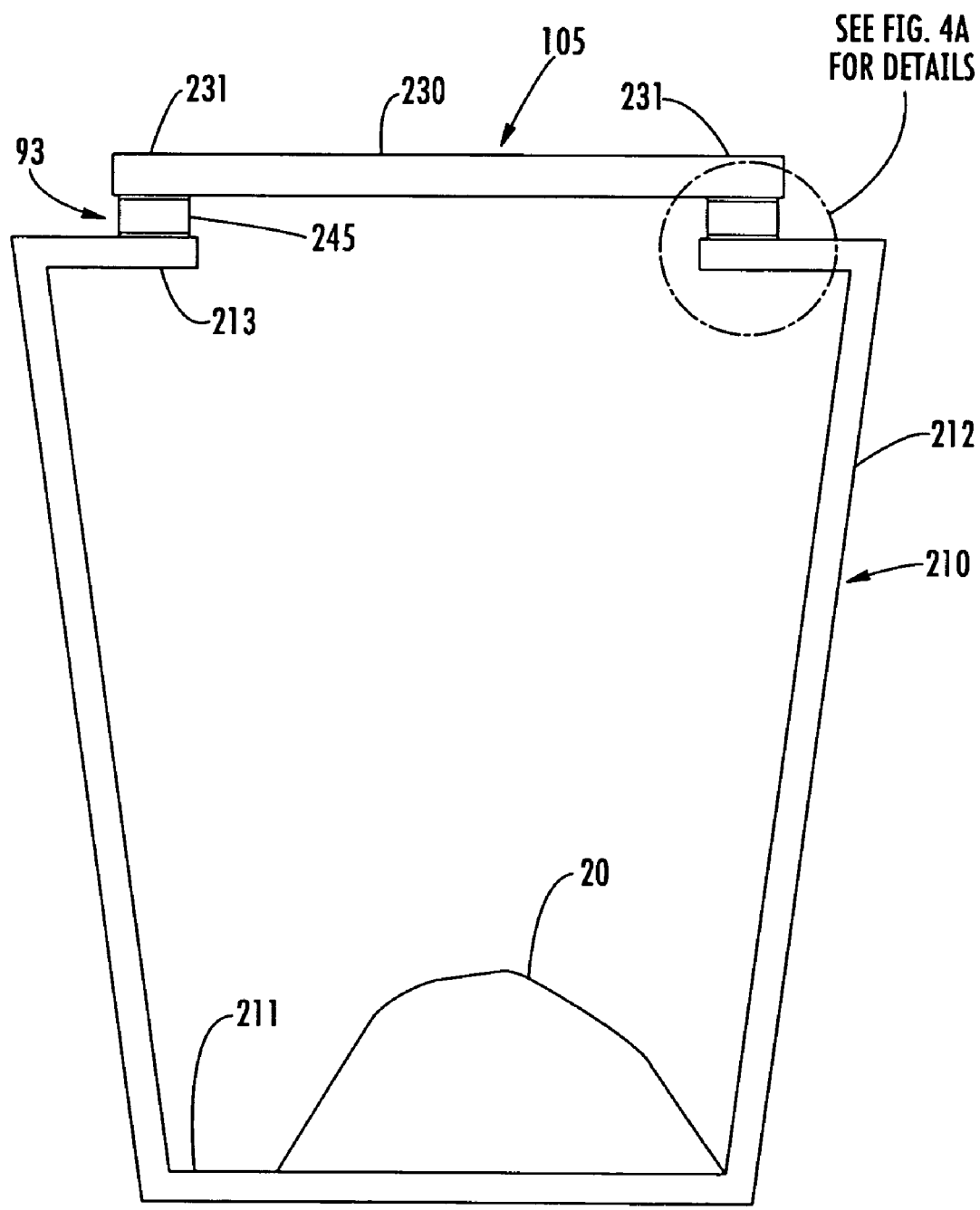
FIG. 4 provides a cross-sectional view of another embodiment of the invention.

FIG. 4 illustrates another embodiment in which a container 105 is comprised of a vessel 210 and a cover 230. For reference, a charge 20 representing chemicals to be processed in the apparatus is illustrated. The vessel 210 which comprises a base 211, a longitudinal wall 212 and a lip 213 is provided. A cover 230 which comprises a lateral flange 231 is also provided. The space between the lip 213 of the vessel 210 and the lateral flange 231 of the cover 230 in FIG. 4 establishes an orifice passageway 93. Structured filtration material 245 is disposed between the lip 213 and the lateral flange 231, that is, disposed across the orifice passageway 93. In preferred embodiments, structured filtration material 245 is a ceramic filter having open pores. Structured filtration material is another example of filtration media. In some embodiments, semi-rigid materials such as fiberglass or metal mesh materials may be used. Such semi-rigid materials are other examples of filtration media.

Container 105 is characterized by having an element or a combination of elements (elements 210, and 230 in this case) which, except for one or more orifice passageways (93 in this case) provide a substantially leak-tight environment for the charge 20.

Figure 4A:
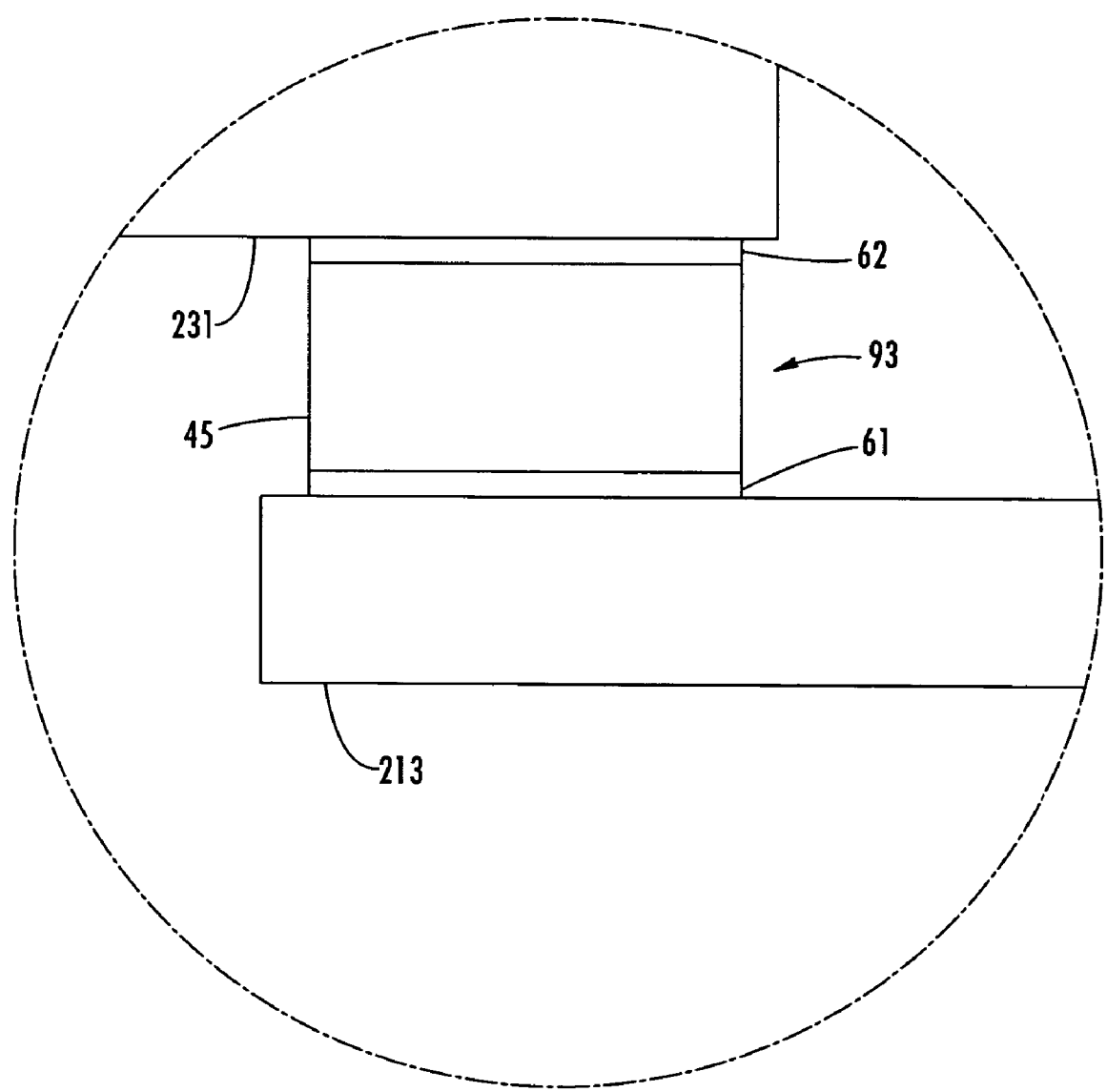
FIG. 4A provides an enlarged cross-sectional view of certain features of the embodiment of FIG. 4.

In some embodiments of the type illustrated in FIG. 4, the weight of the cover 230 is sufficient to seal the interfaces between an edge portion 231 of the cover 230 and the structured filtration material 245, and between the lip 213 and the structured filtration material 245 such that substantially all gases, vapors, liquids, or particles passing between the vessel 210 and the surrounding atmosphere pass through the structured filtration material 245. To further ensure such a seal, as illustrated in FIG. 4A, in some embodiments bonding material 61 may be applied between the lip 213 and the structured filtration material 245, and bonding material 62 may be applied between the lateral flange 231 and the structured filtration material 245. Bonding material 61 and bonding material 62 may comprise the same physical material or different physical material. Such bonding material may comprise adhesives, tapes, mechanical fasteners, or soldered, brazed or welded materials. In embodiments using the bonding material 61 and the bonding material 62, the charge 20 should be placed in the vessel 210 before the bonding materials are applied. When the chemical process for which this apparatus is designed is completed, it is generally convenient to de-bond at least one of the bonding materials 61 or 62 to remove the chemical reaction products. Consequently, in preferred embodiments the bonding material(s) 61 and/or 62 that are to be de-bonded are selected from materials that are easily fractured or dissolved. Examples would be chemically soluble or low-strength adhesives.

Figure 5:
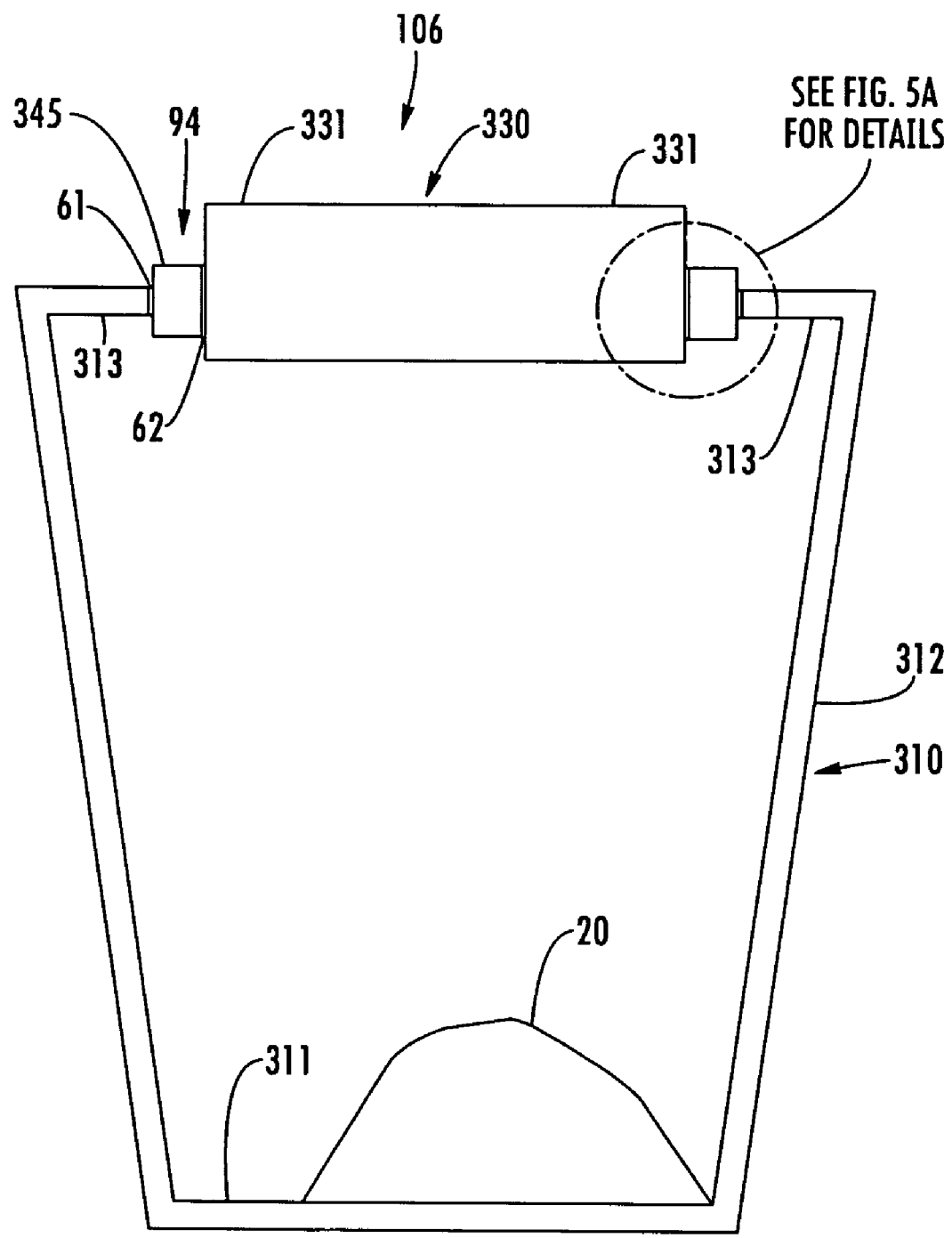
FIG. 5 provides a cross-sectional view of another embodiment of the invention.

FIG. 5 illustrates a further embodiment where a container 106 is comprised of a vessel 310 and a cover 330. The space between the lip 313 of the vessel 310 and the lateral flange 331 of the cover 330 establishes an orifice passageway 94. In this example, the structured filtration material 345 is placed laterally between the edge of the lip 313 which defines the opening in the vessel 310 and the lateral flange 331 of the cover 330, across the orifice passageway 94.

Figure 5A:
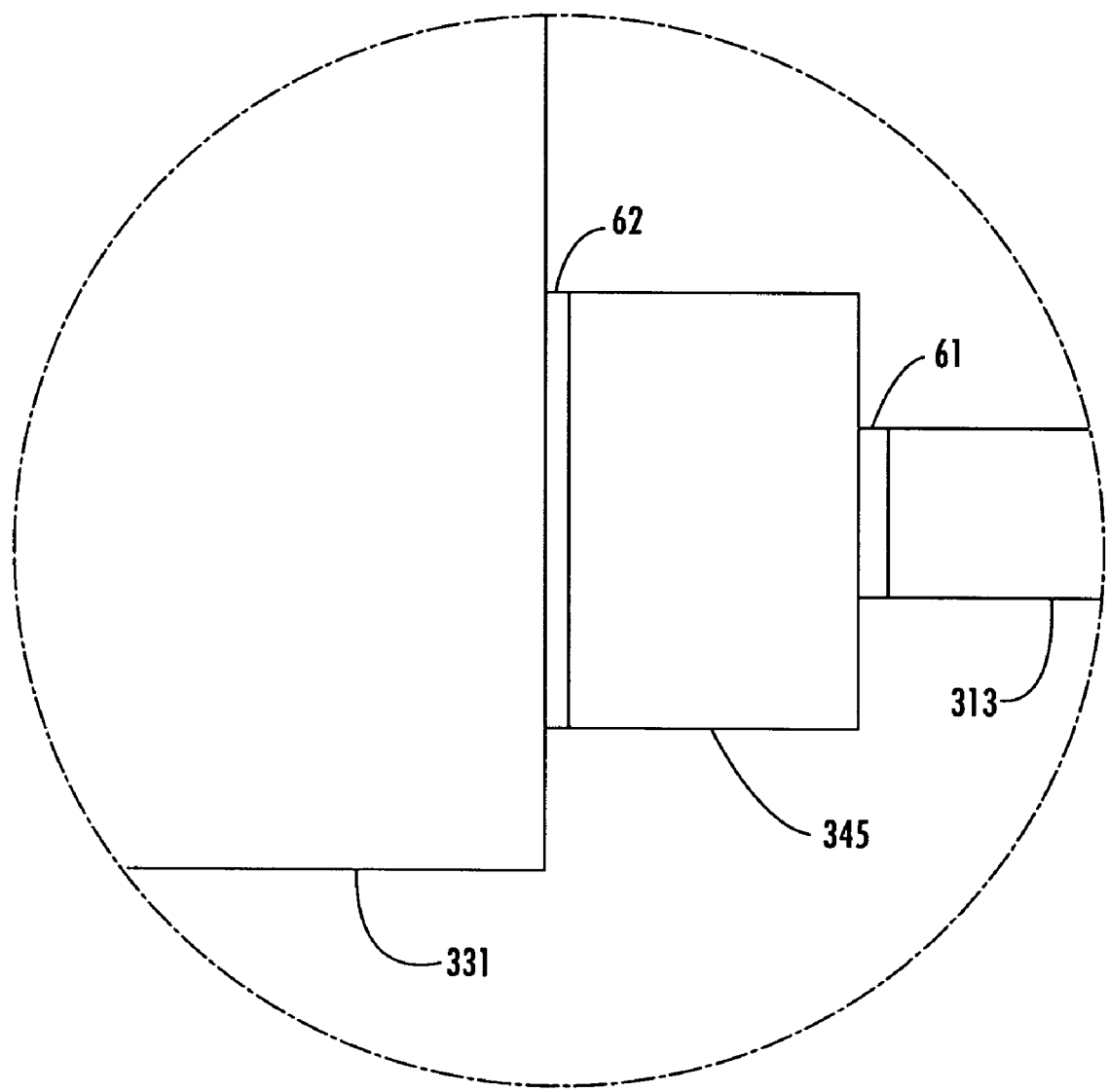
FIG. 5A provides an enlarged cross-sectional view of certain features according to the embodiment of FIG. 5.
Figure 5B:
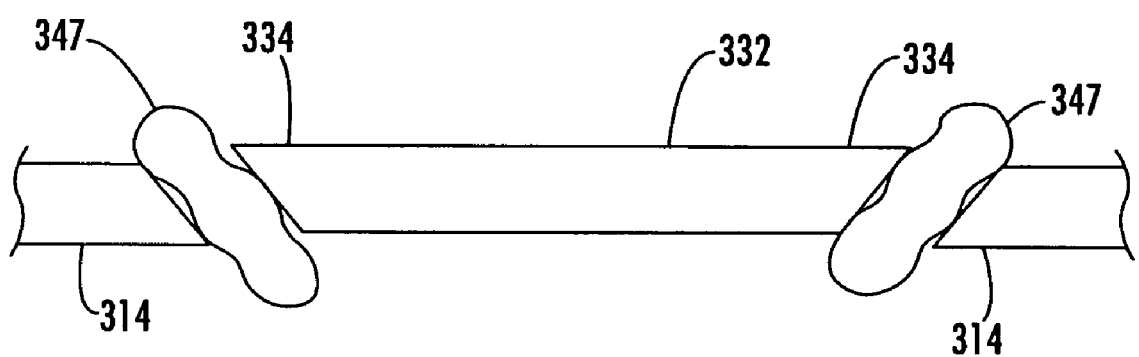
FIGS. 5B and 5C provide cross-sectional details of further embodiments, with FIG. 5C providing both a side and a top view of an embodiment.

Some embodiments utilize semi-rigid filtration material 347, such as depicted in FIG. 5B. In these embodiments it is helpful for facilitating the assembly of the apparatus to have the edge of the lip 314 beveled so that it has a somewhat upward-oriented face, and to have the edge portion 334 of the cover 332 beveled so that it has a somewhat downward-oriented face that approximately matches the incline of the face of the edge of the lip 314. Semi-rigid filtration material 347 is shown disposed between lip 314 and edge portion 334.

Container 106 of FIG. 5 is characterized by having an element or combination of elements (elements 310, and 330 in this case) which, except for any orifice passageways (94 in this case) provide a substantially leak-tight environment for the charge 20.

Figure 5C:
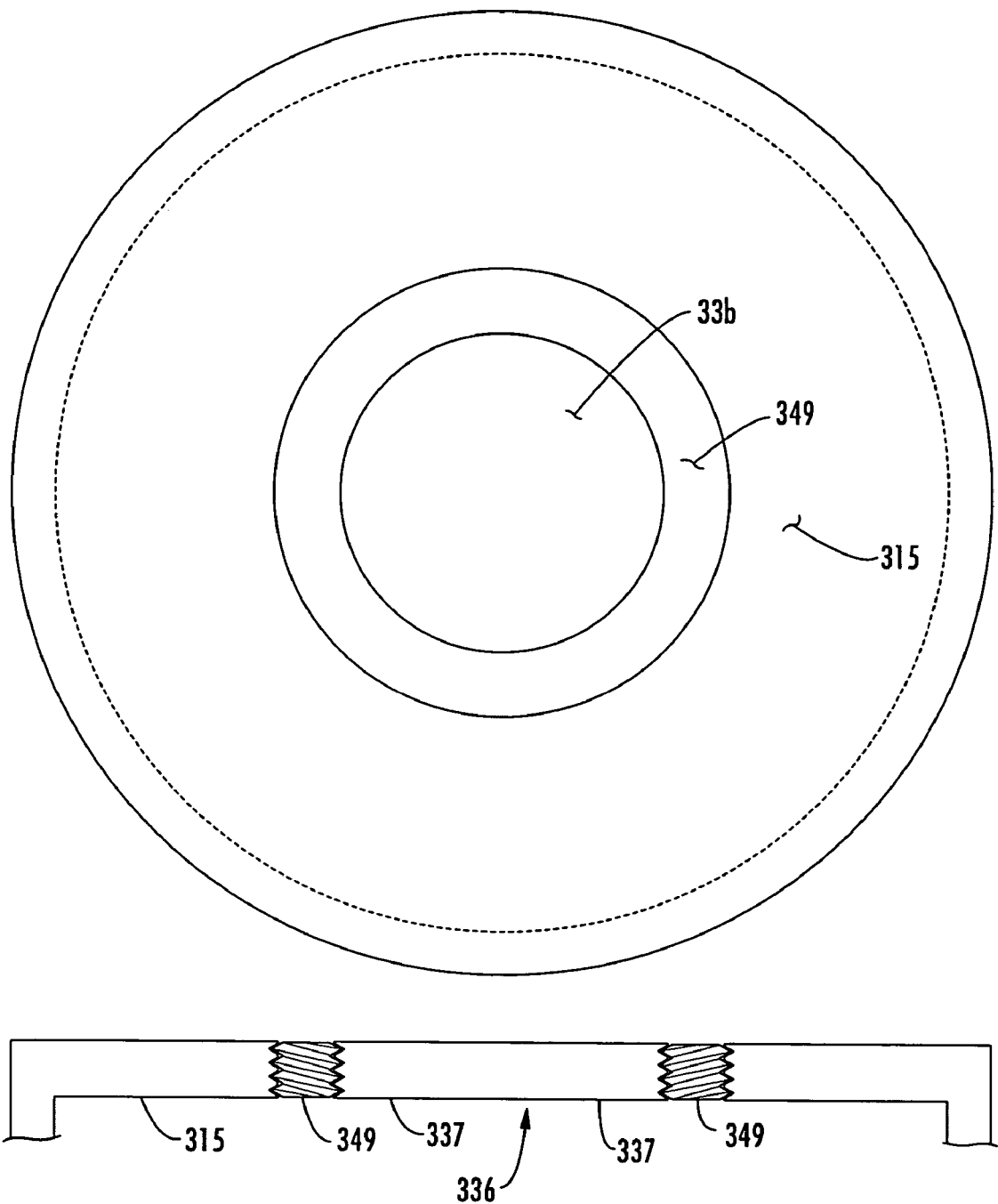

As with the embodiment previously depicted in FIG. 4, and also shown in detail in FIG. 5A for the embodiment of FIG. 5, bonding materials 61 and 62 may be applied to ensure proper sealing of the vessel 310, structured filtration material 345, and cover 330. Alternately in some embodiments, these seals may be enhanced by the use of conforming threads. See for example FIG. 5C where conforming threads are used between the outer edge of threaded filtration material 349 and the edge of the lip 315, and the lateral flange 337 of the cover336 and the inner edge of the threaded structured filtration material 349 such that the structured filtration material 349 and or the cover 336 and or the lip 315 are screwed together.

Figure 6:
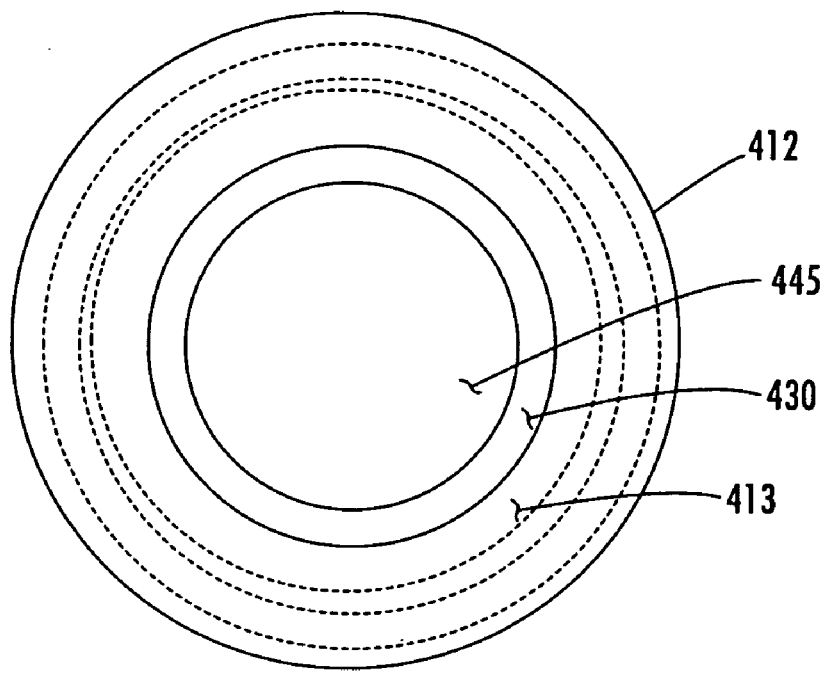
FIG. 6 provides a side cross-sectional view and a top view of another embodiment of the invention.
Figure 6:
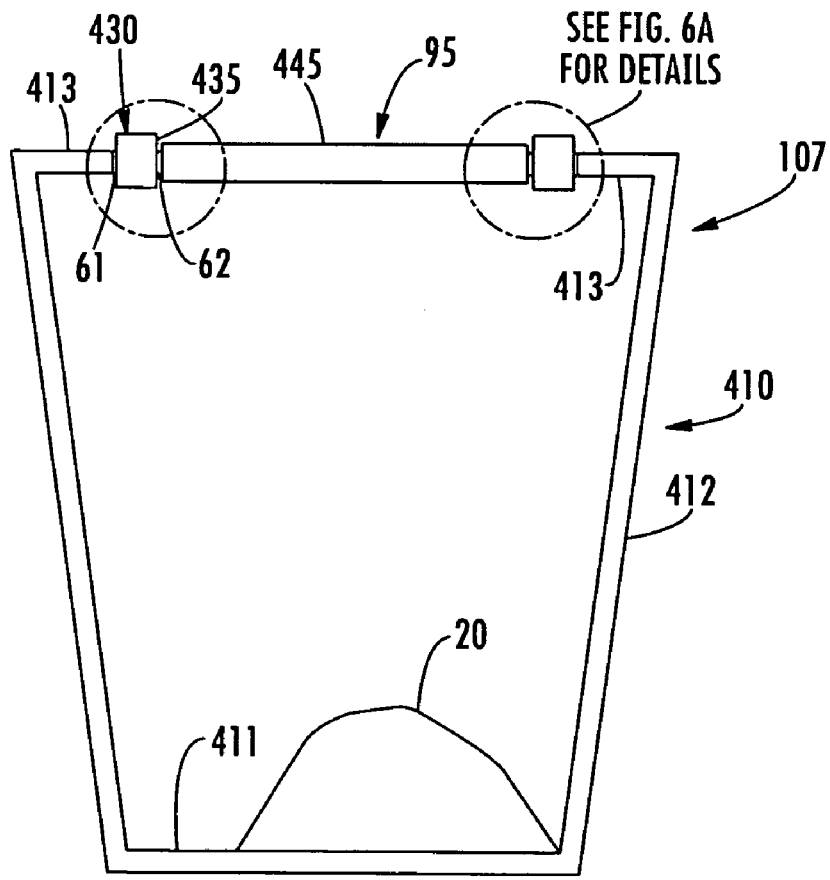

FIG. 6 depicts another embodiment where a container 107 is comprised of a vessel 410 and a cover 430. Vessel 410 has a base 411, a longitudinal wall 412 and a lip 413. In this embodiment, the cover 430 has a hole defined by a cutout edge 435, and the hole establishes an orifice passageway 95. The structured filtration material 445 is disposed across the hole in the cover 430 defined by the cutout edge 435, that is, it is disposed across the orifice passageway 95.

The container 107 is characterized by having an element or a combination of elements (elements 410, and 430 in this case) which, except for any orifice passageways (95 in this case) provide a substantially leak-tight environment for the charge 20.

Figure 6A:
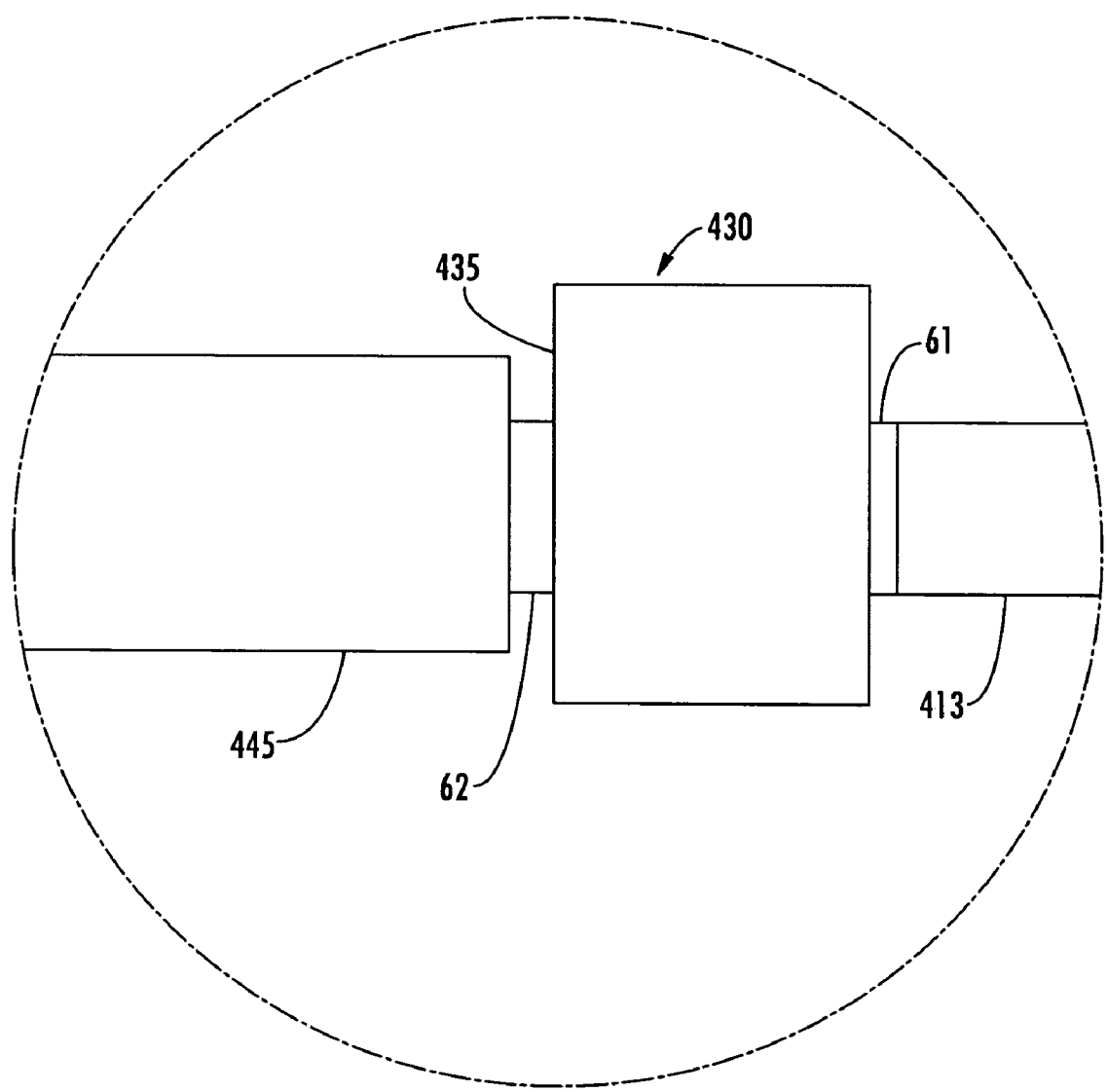
FIG. 6A provides an enlarged cross-sectional portion of certain features of the embodiment according to FIG. 6.

In the embodiment of FIG. 6, the structured filtration material 445 is substantially structurally rigid. Structured filtration material 245 in FIG. 4 and structured filtration material 345 in FIG. 5 are also substantially structurally rigid. Such rigidity may be achieved by solidification of the filtration media itself, such as by sintering it or incorporating it in a matrix material, or such rigidity may be achieved by employing a configuration in which the structured filtration material 245, 345, 445 is comprised of a device such as a disk-shaped canister or tray to confine loose filtration material. In some embodiments such as depicted in FIG. 6 the structured filtration material 445 may be comprised of non-rigid fibrous material (such as metal filament packing) that is wedged into the hole defined by the cutout edge 435 of the cover 430. In such embodiments using non-rigid fibrous materials it is helpful if the quantity of structured filtration material 445 and the size of the hole defined by the cutout edge 435 are matched appropriately so that the structured filtration material 445 stays attached (wedged) in the hole defined by the cutout edge 435. In some embodiments the assembly of the apparatus may be enhanced by providing conforming threaded surfaces (not shown) on the edge of the lip 413 and the outside edge of the cover 430 such that the cover 430 is screwed onto the vessel 410. In some embodiments, as illustrated in FIG. 6A, bonding material 61 may be applied between the lip 413 and the cover 430, and/or bonding material 62 may be applied between the cutout edge 435 of the cover 430 and the structured filtration material 445. In some embodiments cover 430 may comprise surface enhancement elements (not shown) such as a bezel, a collar, a glaze, bonding material, adhesives, or other structures used to improve the sealing function of the interface between the cutout edge 435 and the apparatus elements (e.g., vessel 410 and structured filtration material 445) attached to it.

Figure 7:
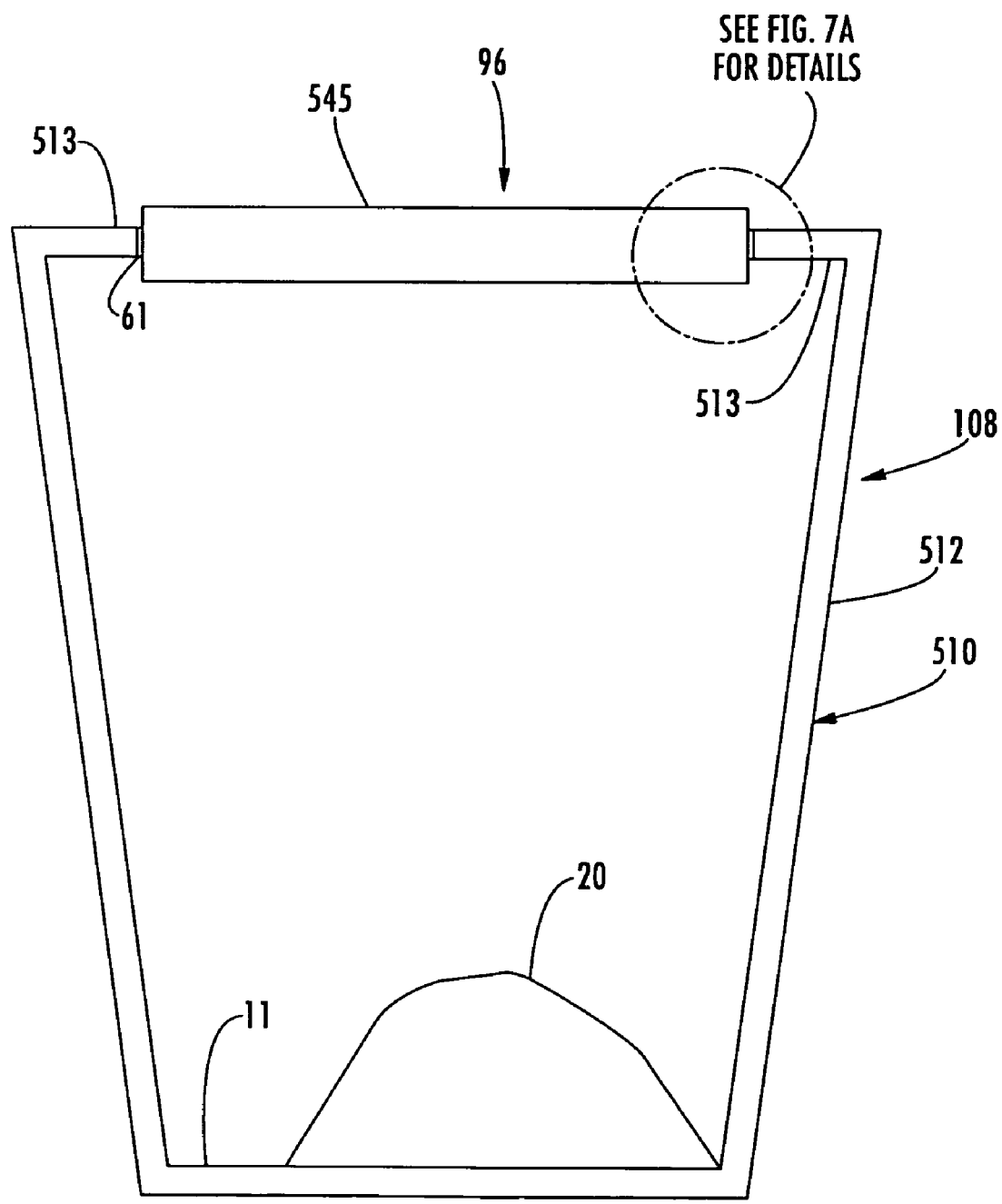
FIG. 7 provides a cross-sectional view of another embodiment of the invention.
Figure 7A:
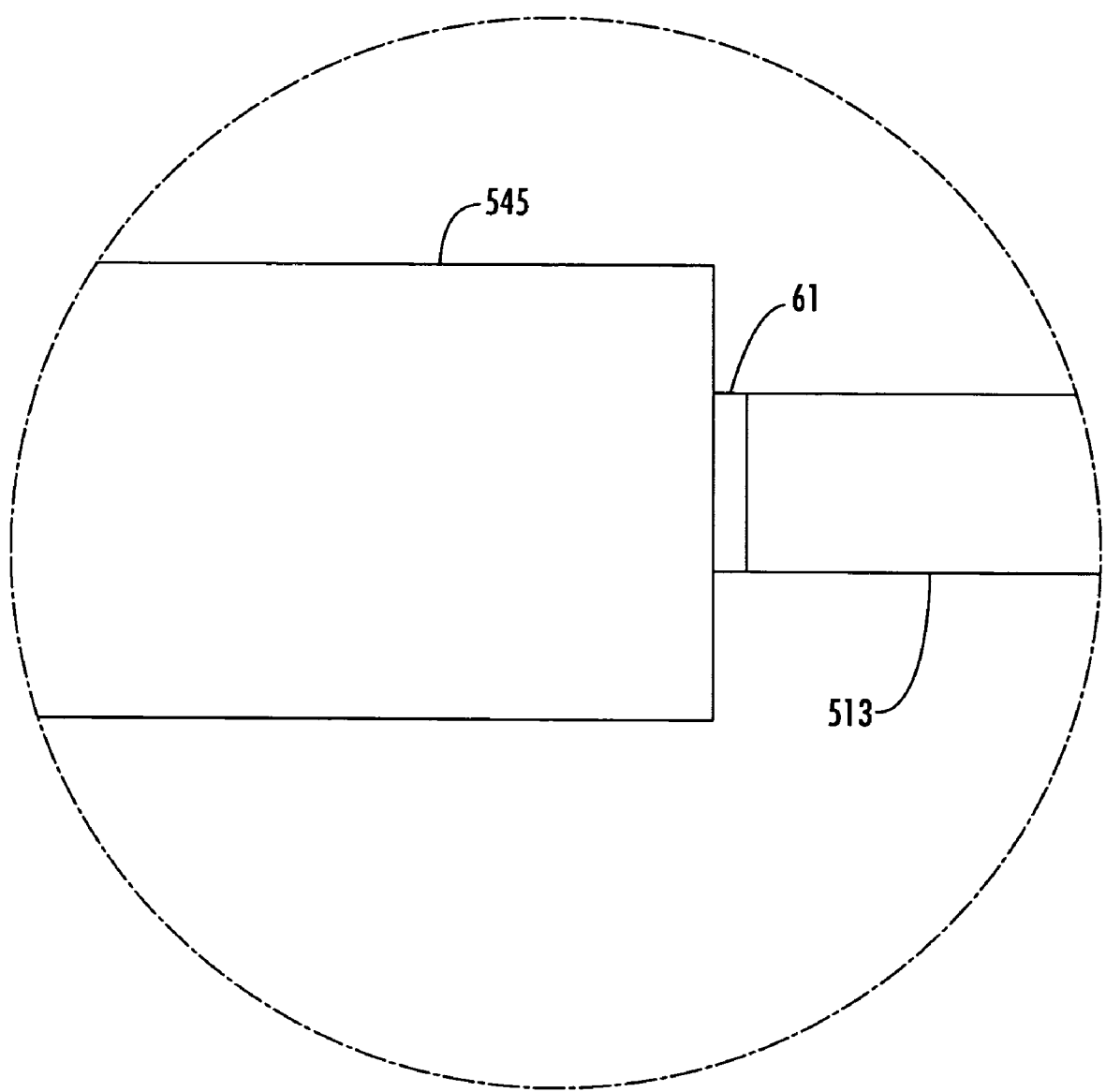
FIG. 7A provides an enlarged cross-sectional view of certain features of the embodiment of FIG. 7.

In an embodiment illustrated in FIG. 7, a container 108 is comprised of a vessel 510 having a base 511 and longitudinal wall 512. The vessel 510 has a lip 513 which establishes an orifice passageway 96. Structured filtration material 545 is disposed across the orifice passageway 96. To enhance the attachment of the structured filtration material 545 to the lip 513, in some embodiments the lip 513 may comprise surface enhancement elements (not shown) such as a bezel, a collar, a glaze, bonding material, adhesives, or other structures used to improve the sealing function of the interface between the lip 513 and the structured filtration material 545. In some embodiments, as illustrated in FIG. 7A, the attachment may be enhanced by bonding material 61 applied between the lip 513 and the structured filtration material 545. The container 108 is characterized an element (element 510 in this case) or a combination of elements which, except for any orifice passageways (96 in this case) provide a substantially leak-tight environment for the charge 20.

Figure 8:
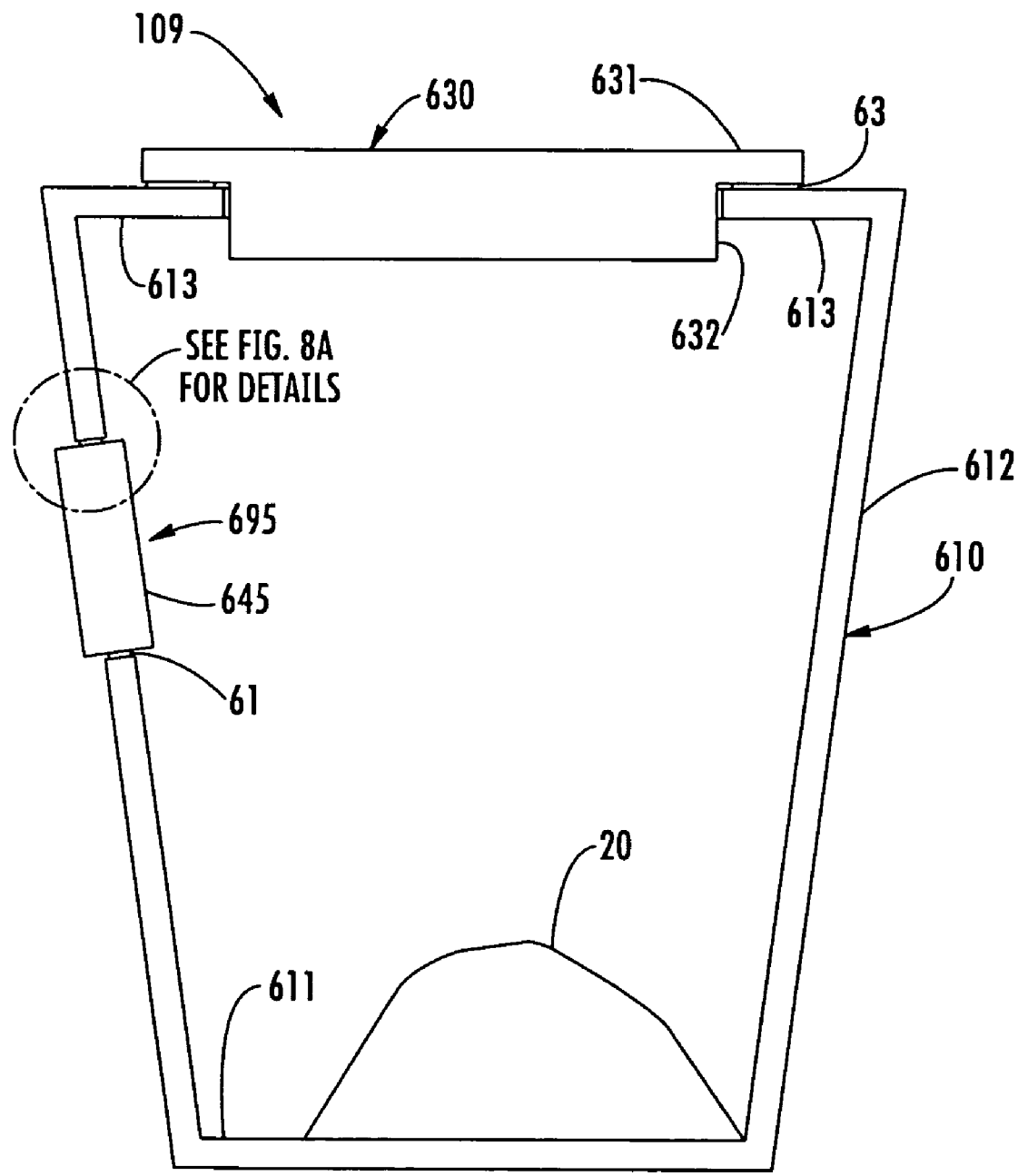
FIG. 8 provides a cross-sectional view of another embodiment of the invention.

FIG. 8 illustrates another embodiment in which a container 109 is comprised of a vessel 610 and a cover 630. Vessel 610 has a base 611, a longitudinal wall 612 and a lip 613. In this embodiment the cover 630 is connected to the vessel 610 using bonding material 63 in a manner which forms a gap-less seal. The term "gap-less seal" means that within the range of expected operating pressures for the apparatus, if the ambient gas, vapor, or liquid pressure on one side of the interface between the combination of elements (the cover 630 and the vessel 610, in this case) is higher than the pressure on the other side of the interface between the combination of elements, substantially none of the undesired gas, liquid, or entrained particles on the high pressure side of the filter will flow through the interface between the combination of the elements. In some variations this seal is accomplished by a mechanical connection, such as a pressure fit or a threaded connection. In other variations, such as illustrated in FIG. 8, bonding material 63 is applied between the lateral flange 631 of the cover 630 and the lip 613 of the vessel 610. In other variations the bonding material 63 may be applied between the edge of the lip 613 and a plug 632 on the cover 630.

Figure 8A:
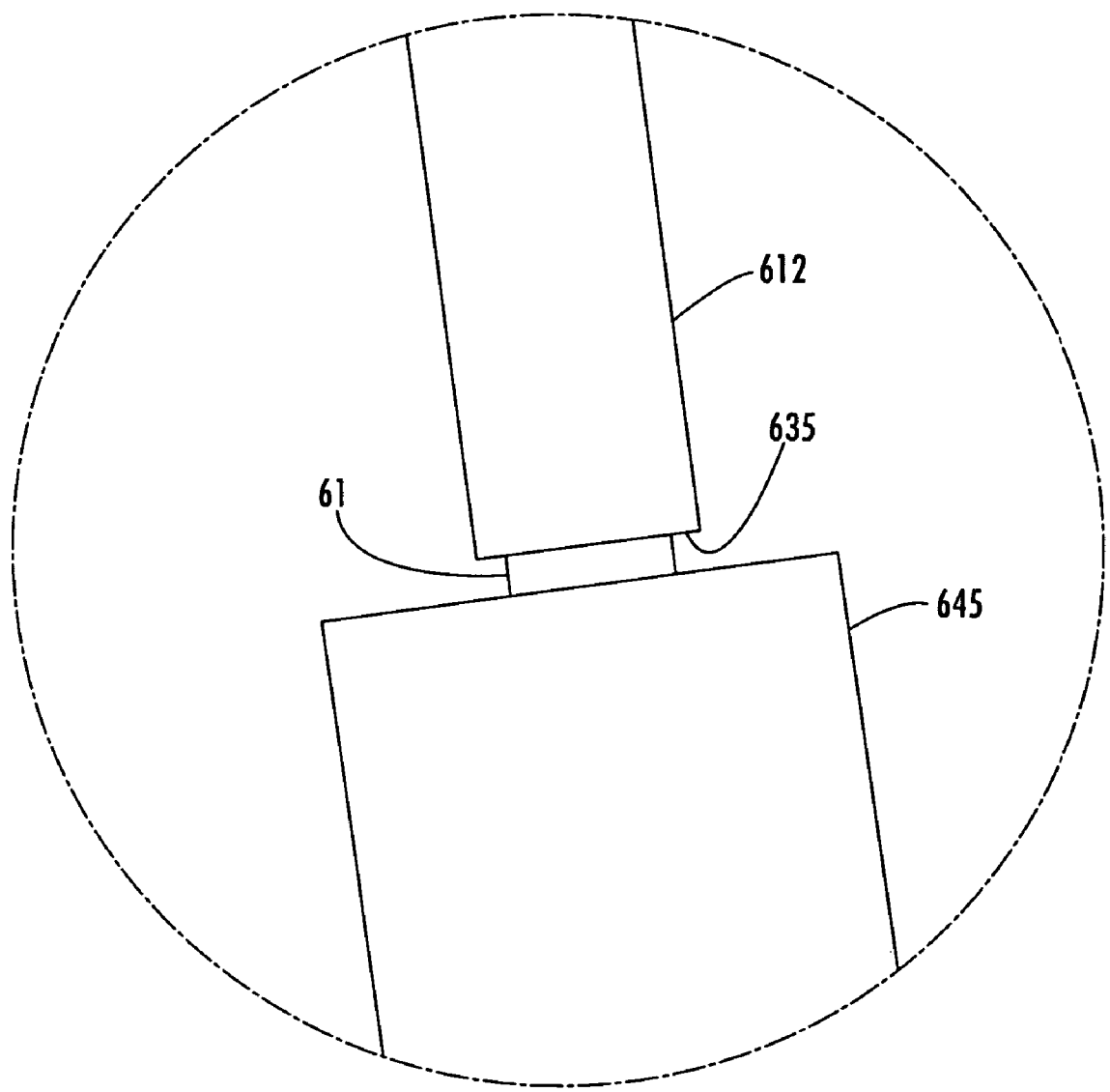
FIG. 8A provides an enlarged cross-sectional portion of certain features of the embodiment of FIG. 8.

In the embodiment of FIG. 8 as detailed in FIG. 8A, the vessel 610 is further comprised of a port 695 defined by a cutout edge 635 in an element (i.e. longitudinal wall 612) of the vessel 610. This port 695 defined by the cutout edge 635 is functionally equivalent to the orifice passageway described in other embodiments. In FIG. 8A the port defined by a cutout edge 635 is in the longitudinal wall 612 of the vessel 610, but in other embodiments the port defined by the cutout edge 635 could be in the base 611 or the lip 613.

The apparatus of FIG. 8 is further comprised of structured filtration material 645 that is disposed across the port 695 defined by the cutout edge 635 in an element of the vessel 610. As detailed in FIG. 8A, bonding material 61 may be applied between the cutout edge 635 and the structured filtration material 645 to further ensure that substantially all gases, vapors, liquids, or particles passing between the vessel 610 and the surrounding atmosphere pass through the structured filtration material 645. The container 109 is characterized as an element or a combination of elements (610, and 630 in this case) which, except for any orifice passageways (695 in this case) provide a substantially leak-tight environment for the charge 20.

In preferred embodiments of this invention, the vessel (e.g., 10, 50, 110, 210, 310, 410, 510, 610) is comprised of a material such as MgO, $ZrO_2$ or a nitride or a carbide that is a susceptor to microwaves. Optionally, the cover (e.g., 30, 130, 230, 330, 430, 530, 630) may also be comprised of a material that is a susceptor to microwaves. In some applications a carbonaceous vessel or cover is not preferred because of the potential for a back reaction with the materials being processed. Using microwave suscepting vessels and covers permits the apparatus to be heated in a microwave oven to induce or enhance desired chemical process reactions. In embodiments where microwaves are not used to heat the apparatus, the vessel (e.g., 10, 50, 110, 210, 310, 410, 510, 610) and cover (e.g., 30, 130, 230, 330, 430, 530, 630) may be comprised of various refractory materials that are commonly used to make crucibles. In these embodiments the apparatus would typically be heated in a conventional thermal furnace (such as resistive heating), or by infrared radiation, or by induction heating.

In some embodiments of the invention, the filtration media may be comprised of loose filtration material such as silica power, carbon powder, cellulose fibers, or metal filaments. Typically these materials are physically confined or contained by other elements of the apparatus to maintain their physical integrity. In other embodiments filtration media may be comprised of semi-rigid filtration material such as woven or non-woven organic or inorganic fibers. In some embodiments the filtration media may be structured filtration material, such as sintered porous metals or oxides, or porous composite materials comprising ceramics, metals, or composites. When semi-rigid filtration media and structured filtration material are used, the filtration media is often substantially structurally rigid by itself, obviating the need for a separate device to confine the material.

In preferred embodiments the filtration media is comprised of a chemically stable filter medium. A highly desirable characteristic of a chemically stable filter medium is that it does not melt at the temperatures experienced under the chemical process conducted in the apparatus in which the chemically stable filter medium is used. Another desirable feature of a chemically stable filter medium is that it does not chemically react with the off-gas emissions of the chemical process, although it is generally desirable that emissions (off-gases and particles) will become physically immobilized in the chemically stable filter medium, such as by plating out on the chemically stable filter medium, or by becoming entrapped in the chemically stable filter medium. In a chemical process involving the reduction of titanium dioxide with lithium, for example, calcium oxide would satisfy these preferences but silica would not be a desirable chemically stable filter medium because it would at least partially react with the excess lithium. Another desirable feature of the chemically stable filter medium is that its physical micro-structure should be such that it provides a tortuous path for off-gas emissions or atmospheric intrusions that would occur in a chemical process operated within the apparatus. This can often be achieved by the selection of an appropriate particle size for the medium. Typically, materials with average particle sizes less than 45 microns work well. Larger particle sizes can be used in larger apparatuses where the flow path is longer. A further desirable property of a chemically stable filter medium is that the medium should be a good thermal insulator. Yet a further desirable property of the chemically stable filter medium in embodiments where the apparatus is heated in a microwave furnace, is that the chemically stable filter medium has a more favorable dielectric loss tangent (i.e., it is less a susceptor of microwaves) than the charge, or the apparatus, or the reaction products. This quality is desired in order to favor absorption of the microwaves by these other items.

Figure 9:
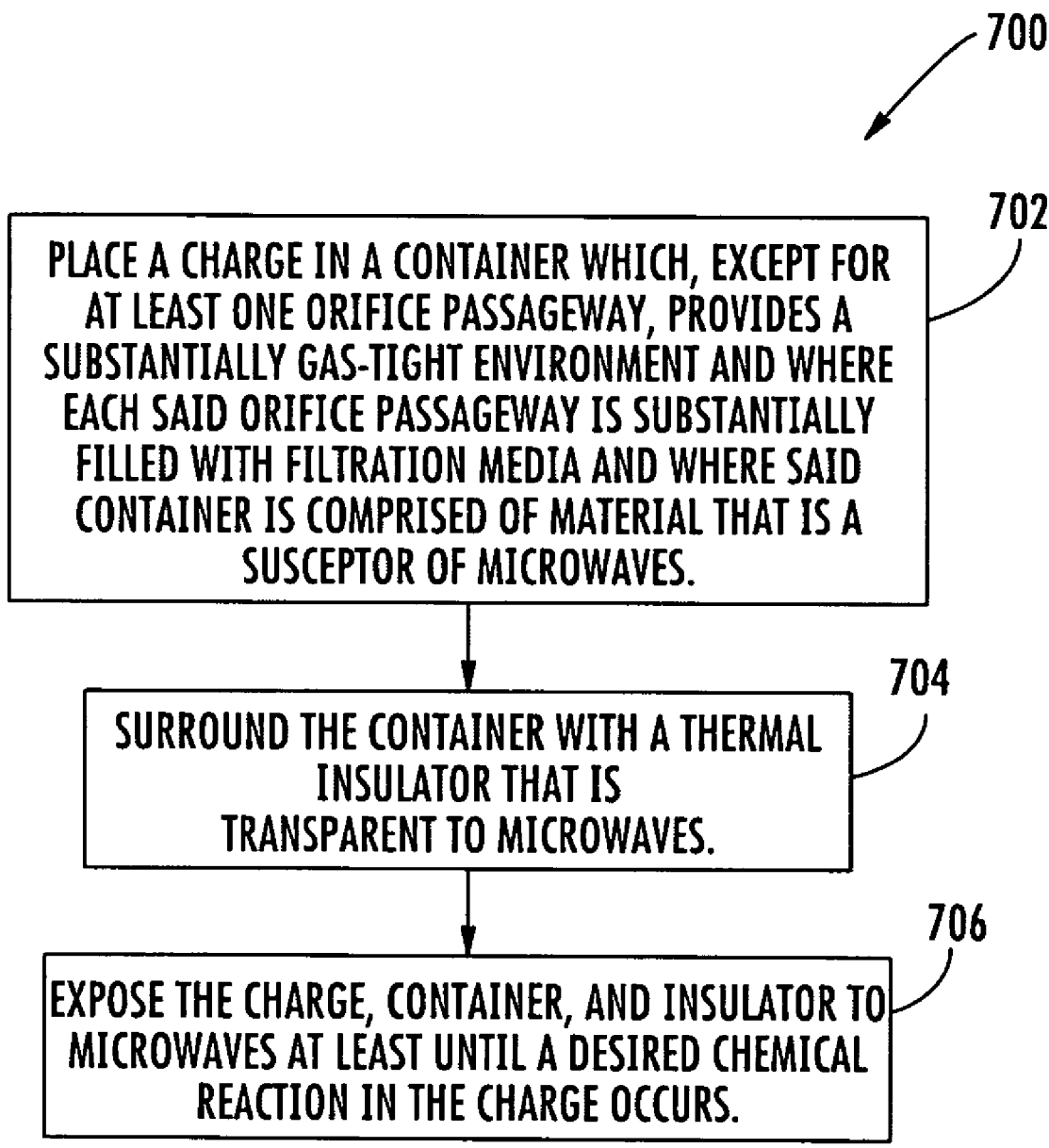
FIG. 9 is a flow chart of a method according to the invention.

FIG. 9 illustrates a method 700 according to the invention. The method begins with step 702 in which a charge is placed in a container that is a susceptor of microwaves. The container is substantially gas-tight except for at least one orifice passageway. The orifice passageway is substantially filled with filtration media. Process 700 continues with step 704 which comprises surrounding the container with a thermal insulating casket that is transparent to microwaves. Method 700 concludes with exposing the charge, the container, and the casket to microwaves for a duration of time at least until a desired chemical reaction occurs in the charge.

Figure 10:
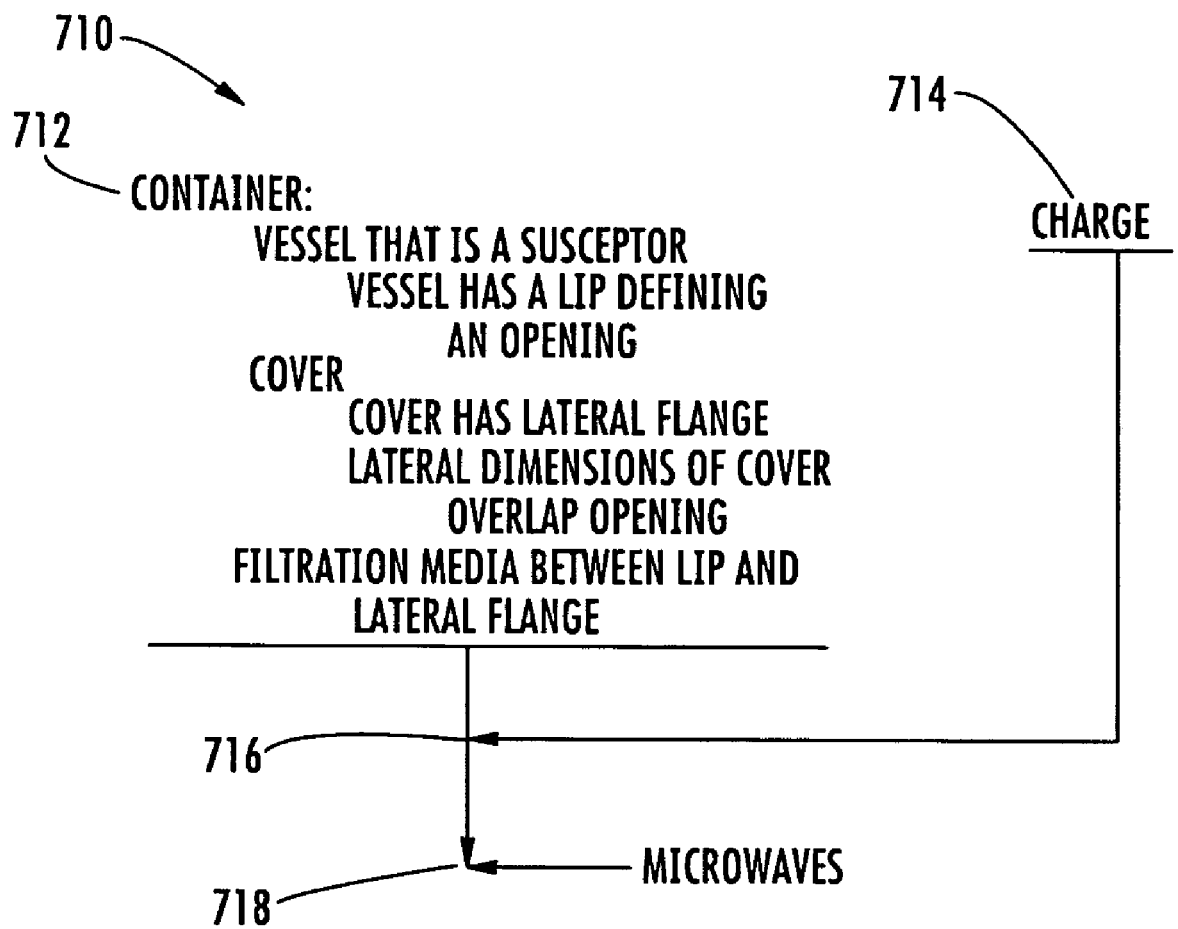
FIG. 10 is a flow chart of an alternate method according to the invention.

FIG. 10 illustrates an alternate method 710 of the invention. The first step 712 of the method involves assembling a container comprising a susceptor vessel having a lip that defines an opening. The container further comprises a cover, where the cover has a lateral flange, with the lateral dimensions of the cover overlapping the opening of the susceptor vessel. The container also comprises filtration media between the lip and the lateral flange. In step 714 a charge is assembled. In step 716 the charge is placed in the container. In step 718 the container and the charge are exposed to microwaves.

Figure 11:
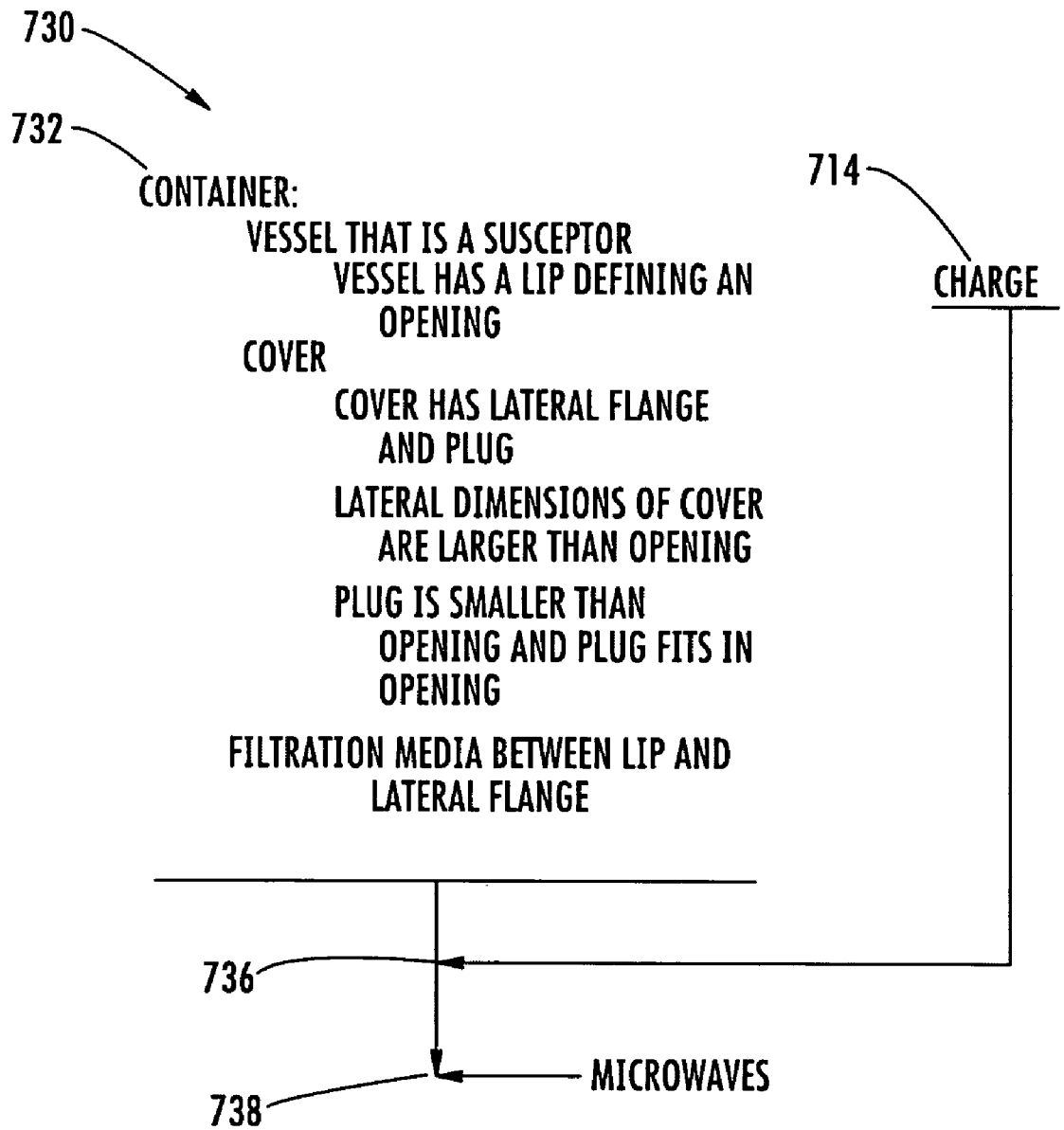
FIG. 11 is a flow chart of an alternate method according to the invention.

FIG. 11 illustrates an alternate method 730 of the invention. The first step 732 of the method involves assembling a container comprising a susceptor vessel having a lip that defines an opening. The container further comprises a cover, where the cover has a lateral flange, with the lateral dimensions of the cover being larger than the opening of the susceptor vessel, and where the cover has a plug and the plug is smaller than the opening and fits into the opening. The container also comprises filtration media between the lip and the lateral flange. In step 734 a charge is assembled. In step 736 the charge is placed in the container. In step 718 the container and the charge are exposed to microwaves.

Figure 12:
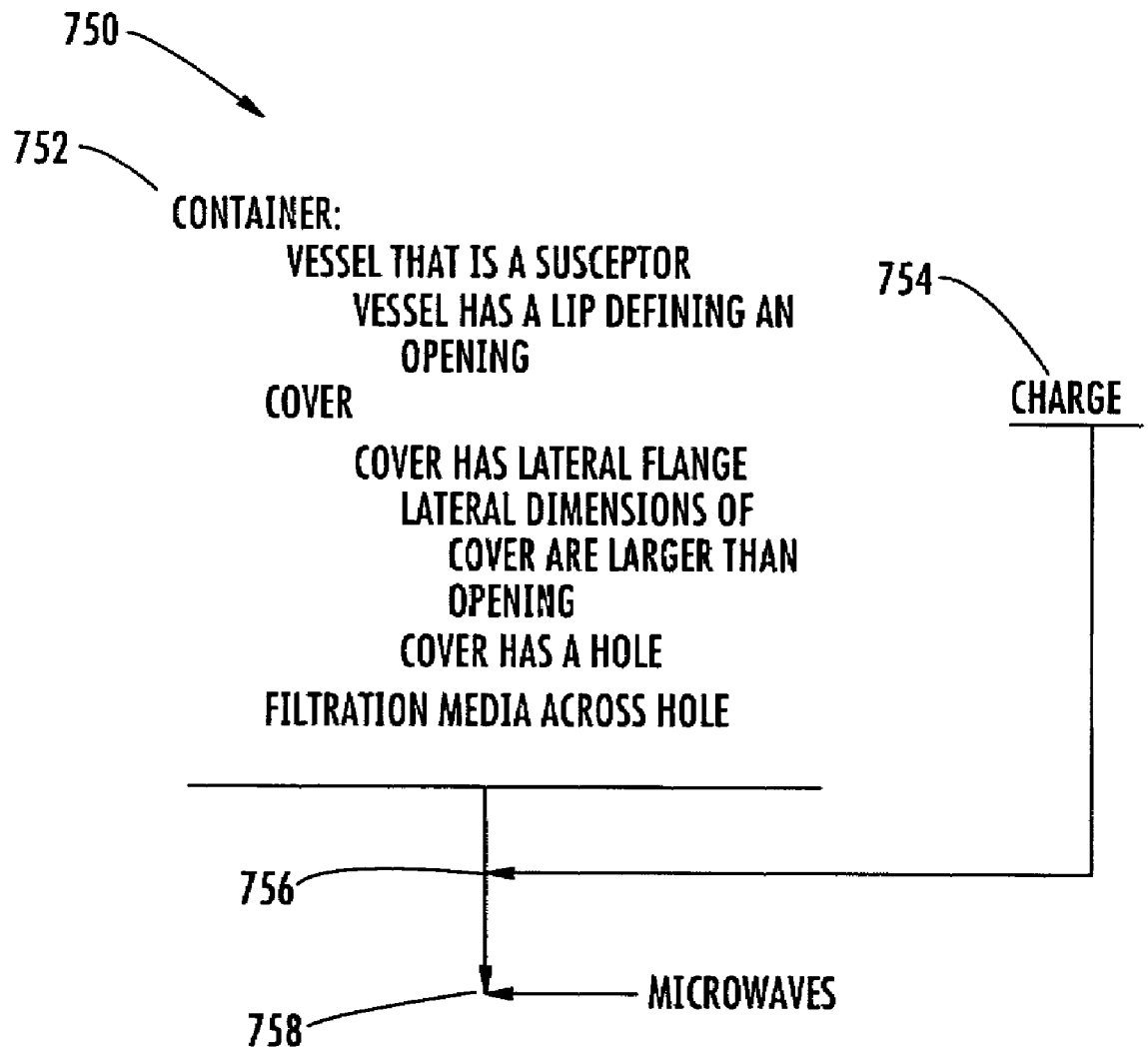
FIG. 12 is a flow chart of an alternate method according to the invention.

FIG. 12 illustrates an alternate method 750 according to the invention. The first step 752 of the method involves assembling a container comprising a susceptor vessel having a lip that defines an opening. The container further comprises a cover, where the cover has a lateral flange, with the lateral dimensions of the cover being larger than the opening of the susceptor vessel, and the cover has a hole. The container also comprises filtration media installed in the hole. In step 754 a charge is assembled. In step 756 the charge is placed in the container. In step 758 the container and the charge are exposed to microwaves.

Figure 13:
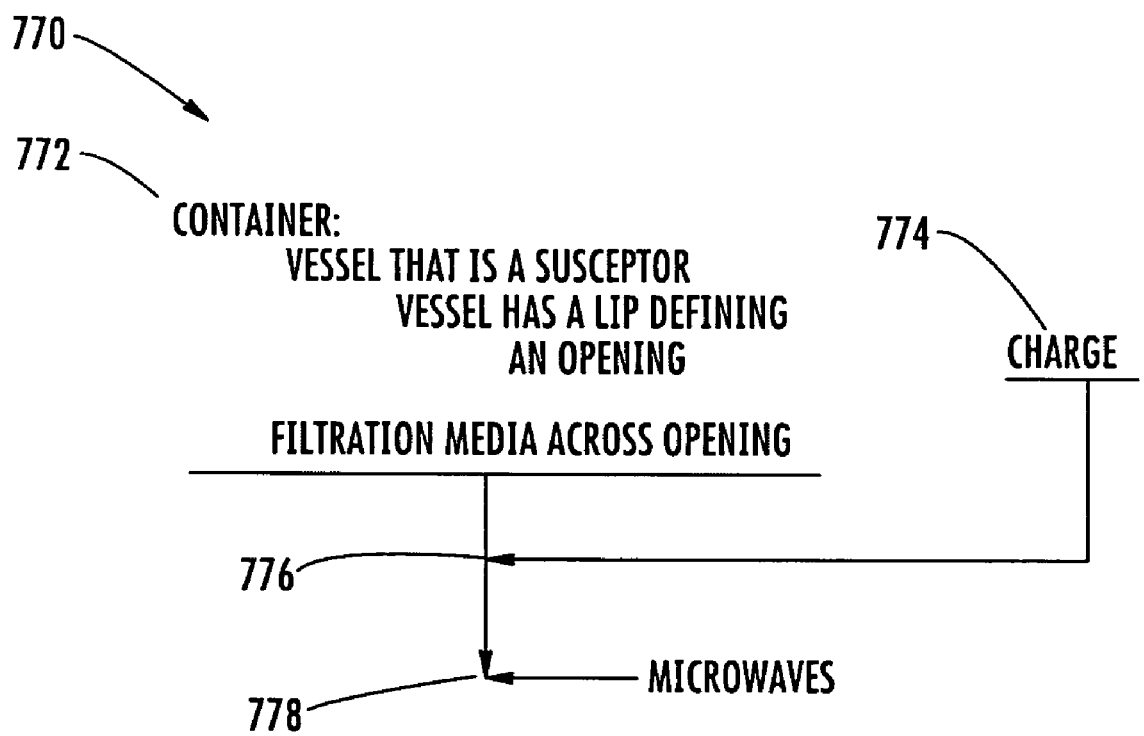
FIG. 13 is a flow chart of an alternate method according to the invention.

FIG. 13 illustrates an alternate method 770 according to the invention. The first step 772 of the method involves assembling a container comprising a susceptor vessel having a lip that defines an opening. The container further comprises filtration media installed in the opening of the susceptor vessel. In step 774 a charge is assembled. In step 776 the charge is placed in the container. In step 778 the container and the charge are exposed to microwaves.

Figure 14:
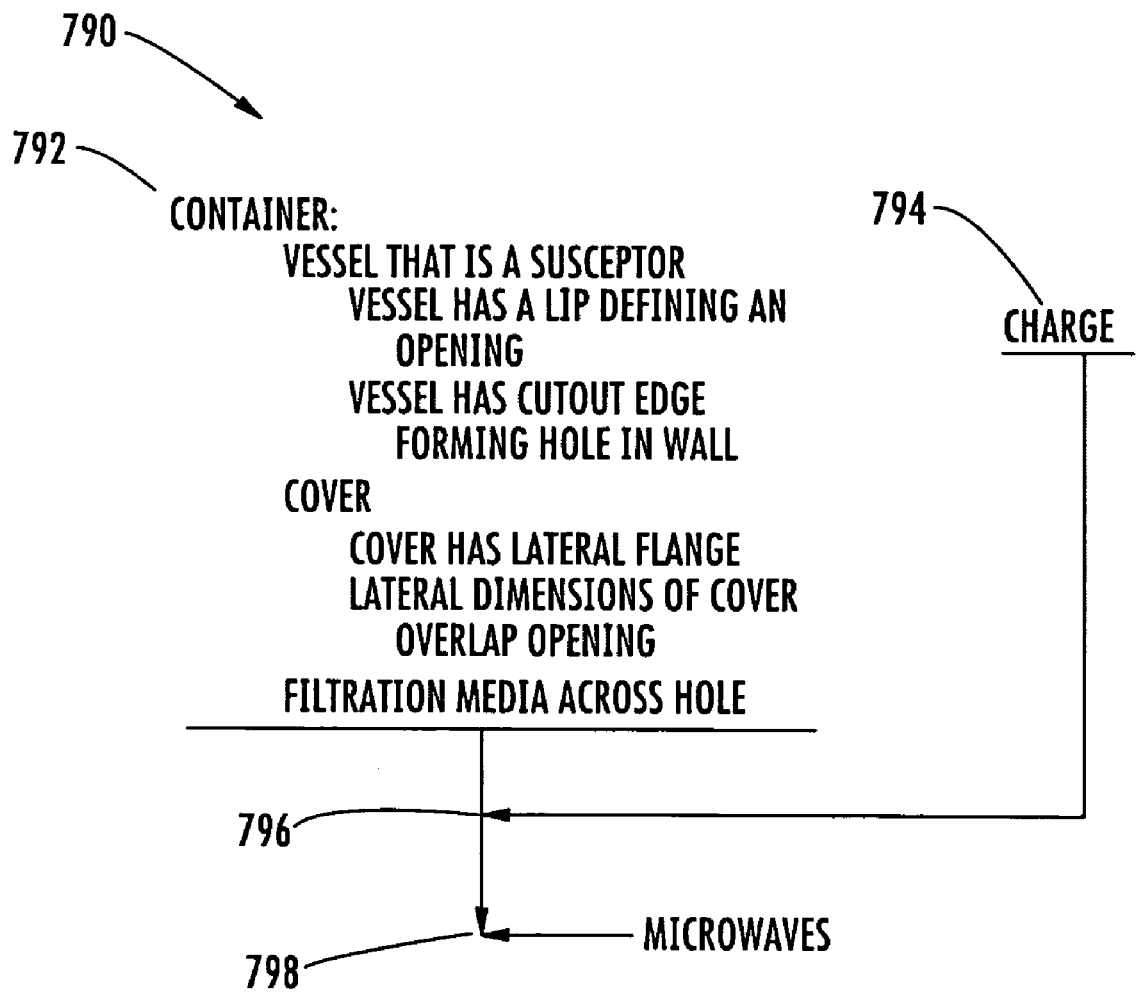
FIG. 14 is a flow chart of an alternate method according to the invention.

FIG. 14 illustrates an alternate method 790 according to the invention. The first step 792 of the method involves assembling a container comprising a susceptor vessel having a lip with an opening, and a hole established by a cutout edge in a wall. The container further comprises a cover that has a lateral flange having lateral dimensions sufficient to overlap the opening. The container also comprises filtration media installed in the opening of the susceptor vessel. In step 794 a charge is assembled. In step 796 the charge is placed in the container. In step 798 the container and the charge are exposed to microwaves.

EXAMPLE

In a test using the embodiment of this invention illustrated in FIG. 3, the first vessel 50 was placed in loose filtration material 40 which had been placed on a generally horizontal surface 71 of the tray 70, such that the loose filtration material substantially circumferentially surrounded the first vessel 50. The loose filtration material was comprised substantially of calcium oxide. The first vessel 50 was a crucible comprising material (MgO) that is a susceptor to microwaves. A charge 20 comprising titanium dioxide and lithium powders was placed in the first vessel 50. The second inverted vessel 80 constructed primarily of magnesium oxide, and comprised of a base 81 and a longitudinal wall 82 with a rim 83, was placed over the first vessel 50 such that substantially all of the circumferential segments of the edge of the rim 83 of the second vessel 80 were resting in or on the loose filtration material 40. The space between the lip 53 of the first vessel 50, the rim 83 of the second vessel 80, and the horizontal surface 71 in FIG. 3 establishes an orifice passageway 92. The container 104 is characterized by having an element or a combination of elements (elements 50, 80 and 70 in this case) which, except for one or more orifice passageways (92 in this case), provide a substantially leak-tight environment for the charge 20. In the test being described, the vessels and tray were placed in a microwave oven and surrounded by a casket of thermally insulating alumina. The entire apparatus was then heated until an exothermic reaction occurred between the elements of the charge 20. Metal vapor and other reaction products were produced as a result of the reaction, but no visible amount of such reaction products escaped from the vessels into the surrounding atmosphere.

The foregoing description of certain embodiments of this invention has been provided for the purpose of illustration only, and various modifications may be made without affecting the scope of the invention as set forth in the claims that follow. The corresponding structures, materials, acts, and equivalents of all means or step plus function elements in the claims below are intended to include any structure, material, or acts for performing the functions in combination with other claimed elements as specifically claimed. Although some embodiments are shown to include certain features, the inventors specifically contemplate that any feature disclosed herein may be used together or in combination with any other feature on any embodiment of the invention. It is also contemplated that any feature may be specifically excluded from any embodiment of an invention.

We claim:

1. An apparatus for chemical processes comprising:
a vessel having a wall extending upward from a base with a lip which defines an opening;
a cover placed over the opening, the cover having a lateral flange, where the position and dimensions of the cover are of sufficient extent in all lateral directions so that at least the lateral flange substantially overlaps the opening; and
loose filtration material disposed between the lip of the vessel and the lateral flange.

2. The apparatus of claim 1 in which:
the lip of the vessel has a circumferential groove;
the cover has a rim which extends downward from the lateral flange and which at least partially fits into the groove; and
the loose filtration material is disposed between the groove and the rim.

3. The apparatus of claim 1 in which:
the vessel is comprised of material that is a susceptor of microwaves.

4. The apparatus of claim 1 in which:
the vessel and the cover are comprised of material that is a susceptor of microwaves.

5. The apparatus of claim 1 in which
the loose filtration material comprises granular material selected from the group consisting of a periodic table Group 2 oxide, silica, carbon, alumina, cellulose, and metal.

6. An apparatus for chemical processes comprising:
loose filtration material dispersed on a horizontal surface;
a first vessel with its base placed on the loose filtration material and having an opening above the surface of the loose filtration material; and
a second inverted vessel having a base and a wall extending downward from the base of the second vessel in its inverted position with the wall having a lip which defines an opening and where the lateral dimensions of the wall are sufficient in all lateral dimensions to fit over the first vessel, where the combination of the height of the loose filtration material and the length of the wall of the second inverted vessel are sufficient such that substantially all of the circumferential segments of the edge of the lip of the inverted second vessel rest on the loose filtration material.

7. The apparatus of claim 6 in which:
the first vessel is comprised of material that is a susceptor of microwaves.

8. The apparatus of claim 6 in which:
the first vessel is comprised of material that is a susceptor of microwaves, and
the second vessel is comprised of material that is essentially transparent to microwaves.

9. The apparatus of claim 6 in which
the loose filtration material comprises granular material selected from the group consisting of a periodic table Group 2 oxide, silica, carbon, alumina, cellulose, and metal.

10. An apparatus for chemical processes comprising:
a vessel, where the vessel is comprised of material that is a susceptor of microwaves and where the vessel has a lip which defines an opening;
a cover placed over the opening, the cover having a lateral flange, where the position and lateral dimensions of the lateral flange are of sufficient extent in all lateral directions to substantially overlap the opening;
filtration media disposed between the lip and the lateral flange; and
bonding material applied between the filtration media and the lip.

11. The apparatus of claim 10 in which the cover is a comprised of material that is a susceptor of microwaves.

12. The apparatus of claim 10 further comprising:
bonding material applied between the filtration media and the cover.

13. The apparatus of claim 10 in which
the filtration media comprises structured filtration material selected from the group consisting of a periodic table Group 2 oxide, silica, carbon, alumina, cellulose, and metal.

14. An apparatus for chemical processing comprising:
a container having a port defined by a cutout edge; and
a filter medium having average particle sizes less than 45 microns disposed across the port to form an orifice passageway, whereby except for the orifice passageway the container provides a substantially leak-tight environment for a charge.

15. The apparatus of claim 14 wherein:
the container further comprises a vessel having a wall extending upward from a base with a lip which defines an opening, and a cover placed over the opening, where the lateral dimensions of the cover are of sufficient extent in all lateral directions to substantially fill the opening in the vessel and where bonding material substantially seals the cover with the lip.

16. The apparatus of claim 14 in which:
the container is comprised of material that is a susceptor of microwaves.

17. An apparatus for chemical processing comprising:
a container comprised of a material that is a susceptor of microwaves and where the container has at least one orifice passageway; and
semi-rigid filtration material comprised of a chemically stable filter medium disposed across the orifice passageway.

18. A method for chemical processing comprising:
placing a charge in a container which, except for at least one orifice passageway, provides a substantially gas-tight environment and where the orifice passageway is substantially filled with filtration media and where the container is comprised of material that is a susceptor of microwaves;

surrounding the container with a thermal insulating casket that is transparent to microwaves; and exposing the charge, container, and casket to microwaves at least until a desired chemical reaction in the charge occurs.

* * * * *